(12) United States Patent
Miyake

(10) Patent No.: US 9,756,126 B2
(45) Date of Patent: Sep. 5, 2017

(54) INFORMATION PROCESSING DEVICE, AND INFORMATION PROCESSING SYSTEM

(71) Applicant: Sony Corporation, Tokyo (JP)

(72) Inventor: Kunihiko Miyake, Kanagawa (JP)

(73) Assignee: Sony Corporation (JP)

( * ) Notice: Subject to any disclaimer, the term of this patent is extended or adjusted under 35 U.S.C. 154(b) by 260 days.

(21) Appl. No.: 14/284,572

(22) Filed: May 22, 2014

(65) Prior Publication Data

US 2014/0358981 A1 Dec. 4, 2014

(30) Foreign Application Priority Data

May 29, 2013 (JP) ................................. 2013-113310

(51) Int. Cl.
*H04L 29/08* (2006.01)
*G06F 3/14* (2006.01)
*H04L 29/06* (2006.01)

(52) U.S. Cl.
CPC ........ *H04L 67/1095* (2013.01); *G06F 3/1454* (2013.01); *H04L 29/06176* (2013.01); *H04L 67/02* (2013.01); *H04L 67/148* (2013.01); *H04L 67/303* (2013.01); *H04L 69/24* (2013.01); *G09G 2340/0442* (2013.01); *G09G 2340/0464* (2013.01); *G09G 2340/0492* (2013.01); *G09G 2370/04* (2013.01); *H04L 65/1059* (2013.01); *H04L 67/34* (2013.01)

(58) Field of Classification Search
CPC .......... G06F 3/14; G06F 3/1454; G06F 3/038; G09G 2340/0442; G09G 2370/16;
(Continued)

(56) References Cited

U.S. PATENT DOCUMENTS

2010/0271461 A1* 10/2010 Takizuka ........... H04N 13/0029
348/43
2011/0298982 A1 12/2011 Kobayashi
(Continued)

FOREIGN PATENT DOCUMENTS

| JP | 2004-163816 A | 6/2004 |
|---|---|---|
| JP | 2009-141484 A | 6/2009 |
| JP | 2012-141570 A | 7/2012 |

OTHER PUBLICATIONS

European Search Report for Application No. 14169205.3-1904 dated, Sep. 22, 2014.

*Primary Examiner* — Nicholas Taylor
*Assistant Examiner* — Michael Li
(74) *Attorney, Agent, or Firm* — Lerner, David, Littenberg, Krumholz & Mentlik, LLP

(57) ABSTRACT

Provided is an information processing device including a setting unit configured to set an angle of view and a display direction of image data to be transmitted to a transmission target device within a range of an angle of view and a display direction represented by capability information based on a display state of an image represented by the image data to be transmitted to the transmission target device on a display screen or a state of an application relating to reproduction of the image data and the capability information with regard to the transmission target device representing the angle of view of the image and the display direction of the image, and a communication control unit configured to cause setting information representing a setting relating to the image data to be transmitted including the set angle of view and display direction to be transmitted to the transmission target device.

12 Claims, 20 Drawing Sheets

(58) Field of Classification Search
CPC ... G09G 2340/0464; G09G 2340/0492; G09G 2370/04; G09G 2370/042; H04L 67/1095; H04L 29/06176; H04L 65/1059; H04L 67/02; H04L 67/148; H04L 67/303; H04L 67/34; H04L 69/24; H04N 13/0029; H04N 13/0059; H04N 21/4122; H04N 21/41407; H04N 21/43637; H04N 21/4307; H04N 21/44004; H04N 13/0066; H04N 21/64322

See application file for complete search history.

(56) References Cited

U.S. PATENT DOCUMENTS

| | | | |
|---|---|---|---|
| 2012/0019732 A1* | 1/2012 | Lee | G06F 17/30274 348/732 |
| 2012/0050331 A1 | 3/2012 | Kanda | |
| 2012/0154386 A1 | 6/2012 | Nagara et al. | |
| 2013/0109371 A1* | 5/2013 | Brogan | G06F 1/1626 455/420 |
| 2013/0141331 A1* | 6/2013 | Shiu | G09G 5/003 345/158 |
| 2013/0174208 A1* | 7/2013 | Lee | H04N 21/4122 725/109 |
| 2013/0223538 A1* | 8/2013 | Wang | H04N 21/4307 375/240.25 |

* cited by examiner

FIG. 9
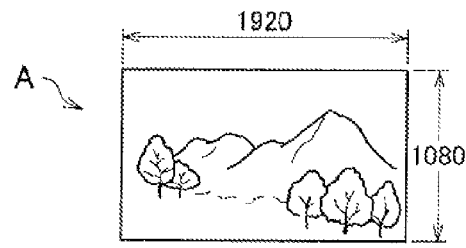
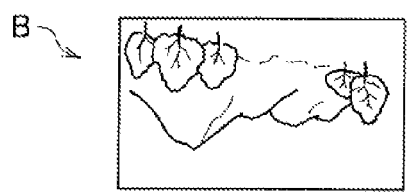
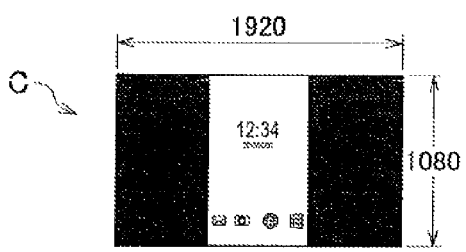
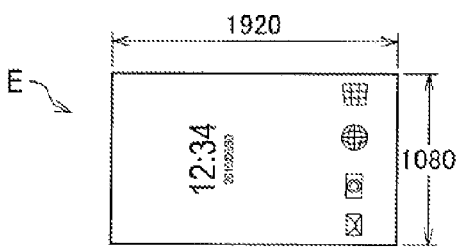
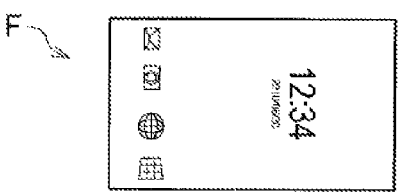

FIG. 13
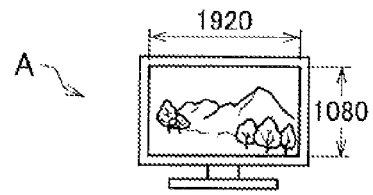
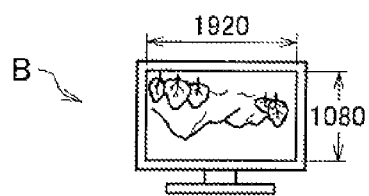
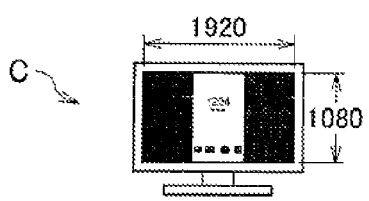
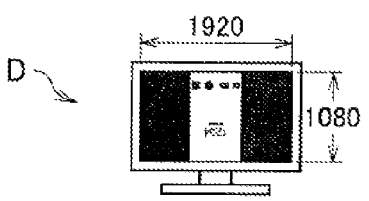
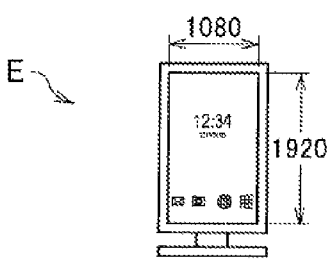
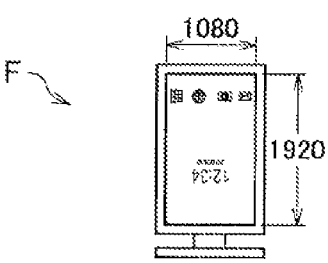

INFORMATION PROCESSING DEVICE, AND INFORMATION PROCESSING SYSTEM

CROSS REFERENCE TO RELATED APPLICATIONS

This application claims the benefit of Japanese Priority Patent Application JP 2013-113310 filed May 29, 2013, the entire contents of which are incorporated herein by reference.

BACKGROUND

The present disclosure relates to an information processing device and an information processing system.

Devices that enable an image to be displayed on a display screen at a vertically long angle of view, for example, smartphones, tablet-type devices, and the like have been widely spread. In addition, among the devices, for example, there are devices in which a sensor such as an acceleration sensor that can detect motions is mounted, and among the devices in which such a sensor is mounted, there are devices having a function of automatically switching an angle of view of an image displayed on a display screen according to, for example, orientations of the devices.

In addition, there are standardized schemes which enable devices to interlink an image displayed on a display screen with each other through communication performed between the devices. As the standardized schemes, for example, the scheme of Wi-Fi MIRACAST and the like are exemplified.

In addition, technologies of causing an image display apparatus that displays an image on its display screen to receive image data and to display an image according to a display orientation of the image display apparatus through communication performed between devices have been developed. As the technology which enables an image display apparatus to receive image data and display an image according to a display orientation of the image display apparatus through communication performed between devices, for example, the technology disclosed in JP 2012-141570A is exemplified.

SUMMARY

Wi-Fi MIRACAST only defines horizontally long angles of view, for example, display angles of view of 4:3, 16:9, and the like. For this reason, if Wi-Fi MIRACAST is used when an image of a smartphone (an example of a device) displaying the image on its display screen at a vertically long angle of view is displayed on a display screen of a display apparatus (an example of another device), the image of the smartphone is displayed in a portion near the center of the display screen of the display apparatus (which is so-called "pillar box display"). Thus, when Wi-Fi MIRACAST is used, a display screen of a device such as the display apparatus described above which is supposed to display a received image thereon is not effectively utilized.

The present disclosure proposes a novel and improved information processing device and information processing system that enable an image displayed on a display screen to be interlinked between devices.

According to an embodiment of the present disclosure, there is provided an information processing device including a setting unit configured to set an angle of view and a display direction of image data to be transmitted to a transmission target device within a range of an angle of view and a display direction represented by capability information based on a display state of an image represented by the image data to be transmitted to the transmission target device to which the image data is transmitted on a display screen or a state of an application relating to reproduction of the image data and the capability information with regard to the transmission target device representing the angle of view of the image and the display direction of the image, and a communication control unit configured to cause setting information representing a setting relating to the image data to be transmitted including the set angle of view and the set display direction to be transmitted to the transmission target device.

According to an embodiment of the present disclosure, there is provided an information processing device including a display control unit configured to cause an image represented by received image data to be displayed on a display screen based on received setting information representing a setting with regard to the image data to be transmitted. The setting information includes an angle of view and a display direction in a range of an angle of view of an image and a display direction of the image which correspond to the device itself. The display control unit causes the image represented by the image data to be displayed on the display screen according to the angle of view and the display direction represented by the setting information.

According to an embodiment of the present disclosure, there is provided an information processing system including an information processing device, and a transmission target device to which image data is transmitted. The information processing device includes a setting unit configured to set an angle of view and a display direction of image data to be transmitted to a transmission target device within a range of an angle of view and a display direction represented by capability information based on a display state of an image represented by the image data to be transmitted to the transmission target device on a display screen or a state of an application relating to reproduction of the image data and the capability information with regard to the transmission target device representing the angle of view of the image and the display direction of the image, and a communication control unit configured to cause setting information representing a setting relating to the image data to be transmitted including the set angle of view and the set display direction to be transmitted to the transmission target device. The transmission target device includes a display control unit configured to cause an image represented by received image data to be displayed on a display screen based on received setting information, and the display control unit causes the image represented by the image data to be displayed on the display screen according to the angle of view and the display direction represented by the setting information.

According to an embodiment of the present disclosure, an image displayed on a display screen can be interlinked between devices.

BRIEF DESCRIPTION OF THE DRAWINGS

FIG. 9 is an illustrative diagram for describing the example of the data transmission process performed in the source device according to the embodiment;

FIG. 13 is an illustrative diagram for describing the second example of the display control process performed in the sink device according to the embodiment;

DETAILED DESCRIPTION OF THE EMBODIMENT(S)

Figure 1:
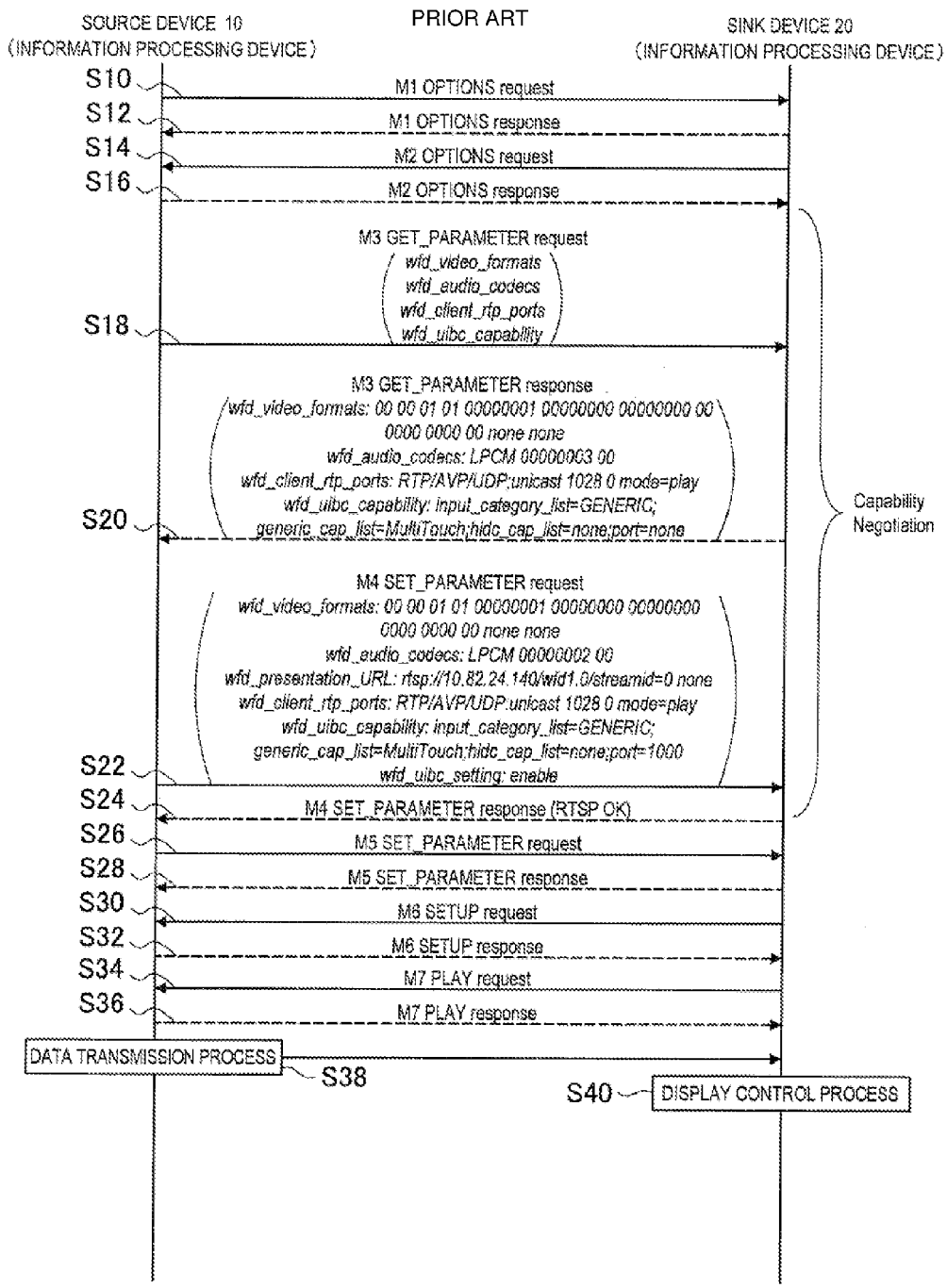
FIG. 1 is a descriptive diagram for describing an example of a problem occurring when Wi-Fi MIRACAST is used.

Hereinafter, a preferred embodiment of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, hereinafter, description will be provided in the following order.
1. Information processing method according to an embodiment
2. Information processing system according to the embodiment
3. Program according to the embodiment (Information Processing Method According to an Embodiment)

Prior to describing configurations of devices constituting an information processing system according to the present embodiment, first, an information processing method according to the present embodiment will be described.

Hereinafter, a target device to which image data is transmitted (transmission target device or information processing device) is referred to as a "sink device." The sink device performs, for example, a display control process of causing an image represented by received image data to be displayed on a display screen. In addition, hereinafter, a device on the side of transmitting signals (digital signals or analog signals) to the sink device (information processing device) is referred to as a "source device."

In addition, hereinafter, the information processing method according to the present embodiment will be described exemplifying a case in which the information processing system according to the present embodiment has a source device and a sink device and each of the source device according to the present embodiment and the sink device according to the present embodiment performs a process according to the information processing method according to the present embodiment.

Here, as a signal transmitted from the source device to the sink device, a signal representing image data is exemplified, but the signal transmitted from the source device to the sink device is not limited thereto. When a signal representing image data is transmitted from the source device to the sink device, for example, the signal may further include data representing sounds (also including music). Hereinafter, as a process of the sink device for reproducing data included in a received signal, a case in which a display control process of causing an image represented by received image data to be displayed on a display screen will be mainly exemplified.

In addition, the source device according to the present embodiment transmits information (for example, setting information that will be described later) relating to the information processing method according to the present embodiment to the sink device according to the present embodiment as will be described later.

An Example of a Problem Occurring when an Existing Standardized Scheme is Used

Prior to describing the information processing method according to the present embodiment, an example of a problem occurring when Wi-Fi MIRACAST that is an existing standardized scheme is used will be described in more detail.

FIG. 1 is a descriptive diagram for describing an example of a problem occurring when Wi-Fi MIRACAST is used showing an example of communication performed between a source device 10 and a sink device 20 when Wi-Fi MIRACAST is used. FIG. 1 shows an example of communication when communication is performed between the source device 10 and the sink device 20 based on an RTSP (Real Time Streaming Protocol). Here, in FIG. 1, a request that includes a command for causing a process to be performed is denoted by "XXX request" (XXX is a string of characters) and a response to the request is denoted by "XXX response" (the same applies in other drawings described below).

When communication is performed based on the RTSP, transmission and reception of information (data) are performed between the source device 10 and the sink device 20 as shown in Steps S10 to S16 of FIG. 1, and then "Capability Negotiation" is performed as shown in Steps S18 to S24 of FIG. 1. After "Capability Negotiation" is performed, transmission and reception of information (data) are performed between the source device 10 and the sink device 20 as shown in Steps S26 to S36 of FIG. 1. The source device 10 transmits image data corresponding to the result of "Capability Negotiation" or the like to the sink device 20 (S38). The sink device 20 causes an image represented by the received image data to be displayed on a display screen based on the result of "Capability Negotiation" (S40). When, for example, audio data is transmitted from the source device 10 in Step S38, the sink device 20 can also perform a process of outputting sounds represented by the audio data from an audio output device such as a speaker in Step S40.

Here, "Capability Negotiation" in the communication based on the RTSP includes, for example, a process of the source device 10 for checking an image and sound reproduction capability of the sink device 20 (Steps S18 and S20) and a process of the source device 10 for transmitting information relating to data to be transmitted to the sink device 20 (Step S22). To be more specific, in "Capability Negotiation" in the communication based on the RTSP, for example, information indicating an encoding scheme of an image and a sound transmitted from the source device 10 to the sink device 20, information indicating resolution of the image (for example, 1920×1080, 1280×720, or the like), and information indicating a frame rate (for example, 60P, 30P, 24P, or the like) are exchanged.

However, Wi-Fi MIRACAST only defines horizontally long angles of view, for example, display angles of view of 4:3, 16:9, and the like as described above. For this reason, when Wi-Fi MIRACAST is used, an image displayed on a display screen of the sink device 20 through the display control process (the process of Step S40 of FIG. 1) may undergo so-called "pillar box display."

Figure 2:
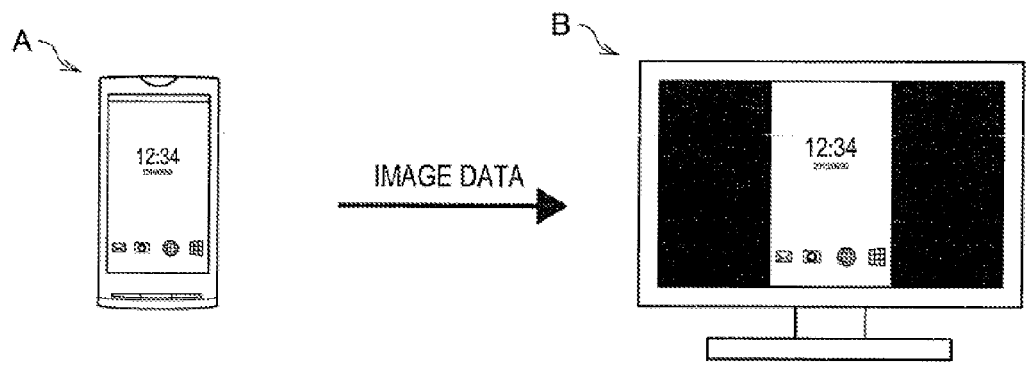
FIG. 2 is an illustrative diagram for describing an example of the problem occurring when Wi-Fi MIRACAST is used.

FIG. 2 is an illustrative diagram for describing an example of the problem occurring when Wi-Fi MIRACAST is used. FIG. 2 shows an example in which an image that has been displayed on a display screen of a smartphone (device shown in A of FIG. 1, which corresponds to an example of the source device) is displayed on a display screen of a display apparatus (device shown in B of FIG. 1, which corresponds to an example of the sink device) (display screen of a display device included in the display apparatus) as the smartphone transmits image data to the display apparatus.

When Wi-Fi MIRACAST is used, the vertically long image that has been displayed on the display screen of the smartphone shown in A of FIG. 2 is displayed in a portion near the center of the display screen of the display apparatus as shown in B of FIG. 2, and no image is displayed in other portions (so-called "pillar box display"). Thus, when Wi-Fi MIRACAST is used, there are such portions in which no image is displayed as shown in B of FIG. 2, and therefore the display screen of the display apparatus is not effectively utilized.

Process Relating to the Information Processing Method According to the Present Embodiment Next, a process relating to the information processing method according to the present embodiment will be described. Hereinafter, an example of the process relating to the information processing method according to the present embodiment will be described exemplifying a case in which the process relating to the information processing method according to the present embodiment is applied to Wi-Fi MIRACAST. Note that the process relating to the information processing method according to the present embodiment can be applied to any communication scheme of either of wired or wireless communication without being limited to Wi-Fi MIRACAST.

Figure 3:
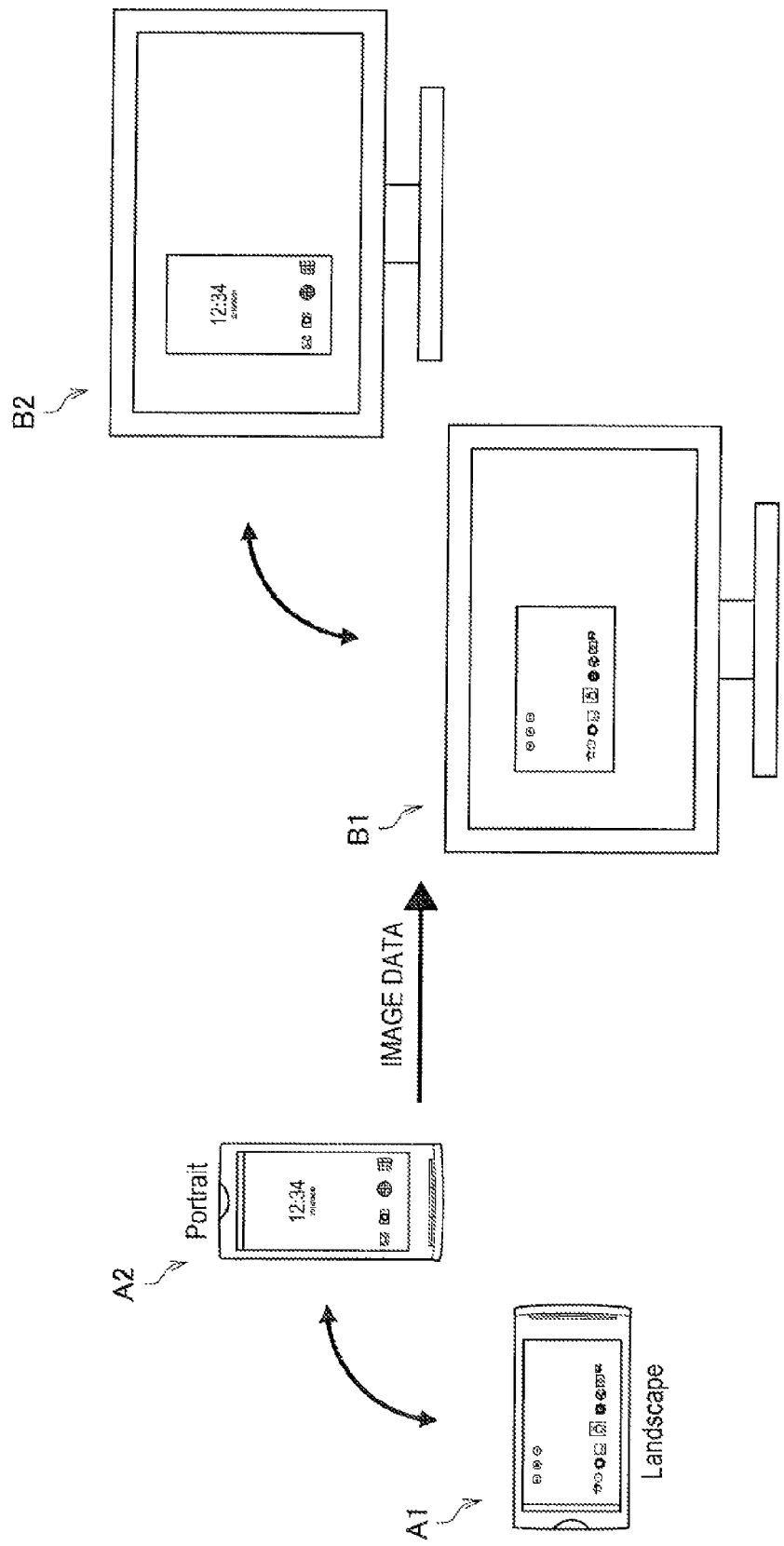
FIG. 3 is an illustrative diagram for describing an overview of an information processing method according to an embodiment.
Figure 4:
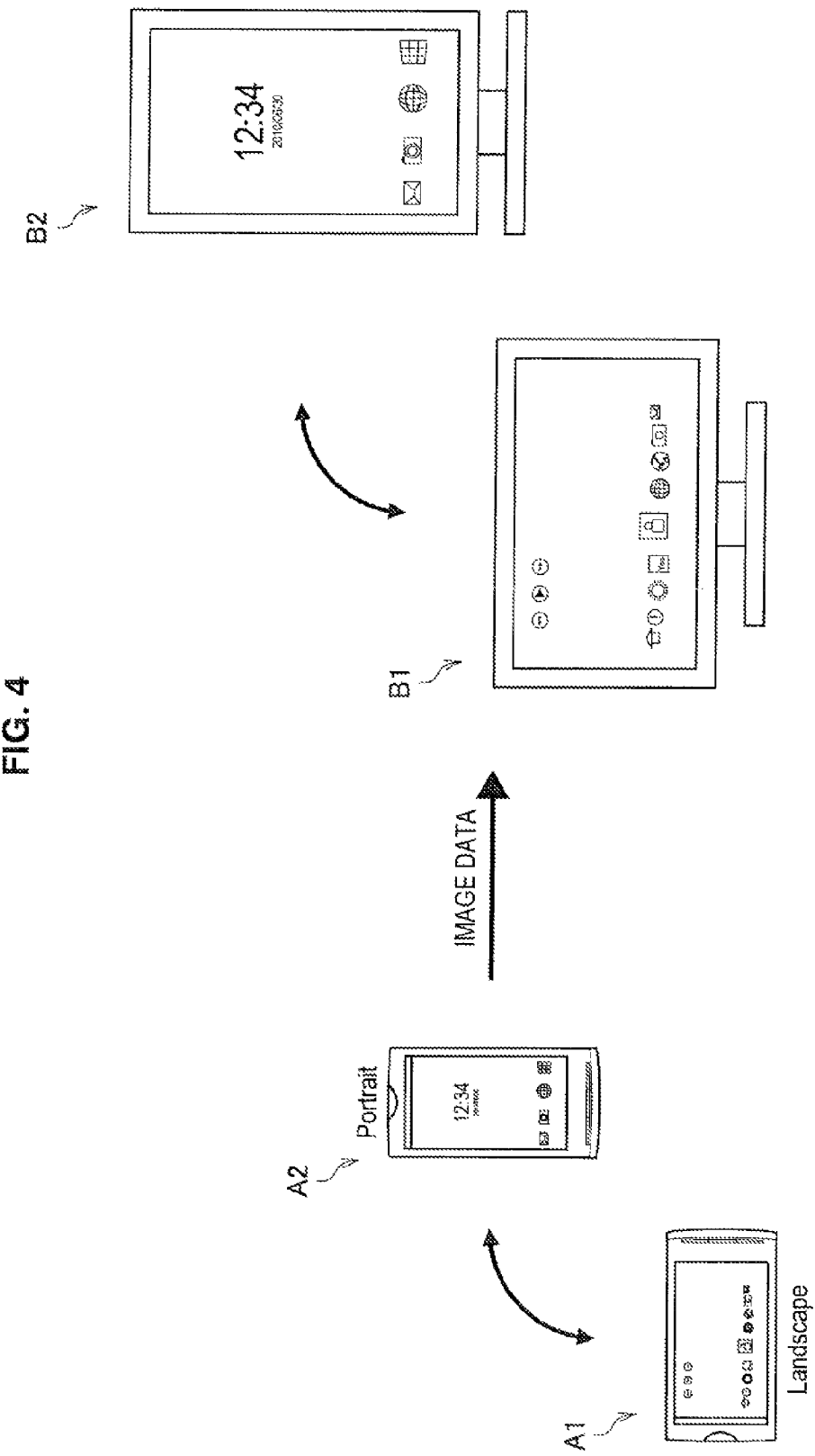
FIG. 4 is an illustrative diagram for describing the overview of the information processing method according to the embodiment.

[2-1] Overview of the Information Processing Method According to the Present Embodiment FIGS. 3 and 4 are illustrative diagrams for describing an overview of the information processing method according to the present embodiment showing an example of interlinking of an image displayed on display screens between devices which is realized by using the information processing method according to the present embodiment.

Here, FIGS. 3 and 4 each show an example in which an image that has been displayed on a display screen of a smartphone (the device shown in A1 and A2 of FIG. 3 and A1 and A2 of FIG. 4, which corresponds to an example of the source device according to the present embodiment) is displayed on a display screen of a display apparatus (the apparatus shown in B1 and B2 of FIG. 3 and B1 and B2 of FIG. 4, which corresponds to an example of the sink device according to the present embodiment) as the smartphone transmits image data to the display apparatus, in the same manner as in the example shown in FIG. 2.

Note that FIGS. 3 and 4 show the example in which the smartphone (the device shown in A1 and A2 of FIG. 3 and A1 and A2 of FIG. 4, which corresponds to an example of the source device according to the present embodiment, and hereinafter the same applies to FIGS. 3 and 4) transmits the image data to the display apparatus (the apparatus shown in B1 and B2 of FIG. 3 and B1 and B2 of FIG. 4, which corresponds to an example of the sink device according to the present embodiment, and hereinafter the same applies to FIGS. 3 and 4), but data transmitted from the smartphone (an example of the source device according to the present embodiment) to the display apparatus (an example of the sink device according to the present embodiment) is not limited thereto. For example, audio data may be transmitted from the source device according to the present embodiment to the sink device according to the present embodiment as described above. When audio data is transmitted from the source device according to the present embodiment to the sink device according to the present embodiment, the sink device according to the present embodiment causes sounds represented by the received audio data to be output from an audio output device.

Referring to FIG. 3, when the image being displayed on the display screen of the smartphone changes its state from the state shown in A1 of FIG. 3 to the state shown in A2 of FIG. 3, for example, as shown in A1 and A2 of FIG. 3, the display apparatus changes display of an image window-displayed within the display screen thereof (the image that has been displayed on the display screen of the smartphone) interlinked with the change of the image that has been displayed on the display screen of the smartphone.

Figure 5:
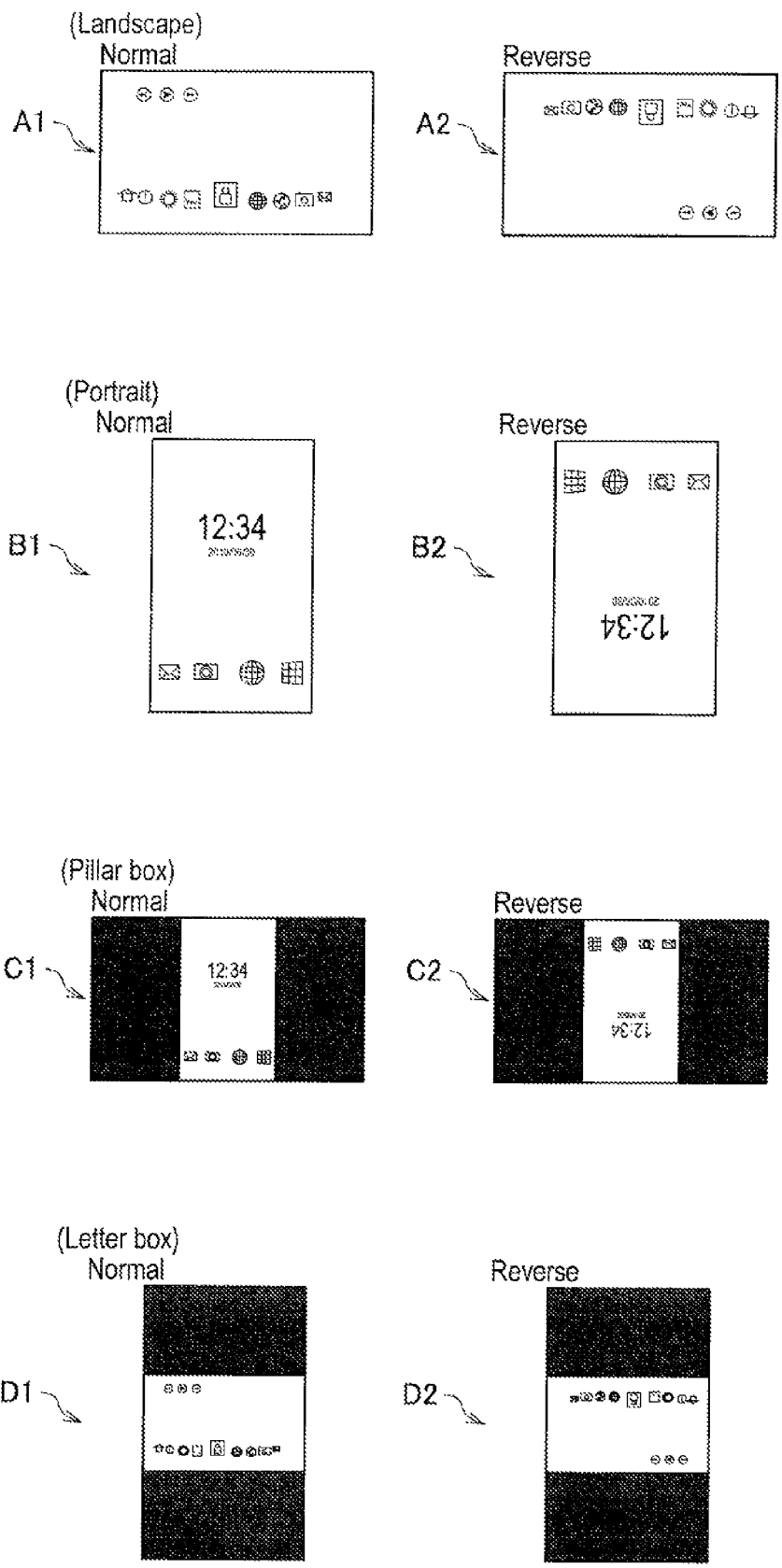
FIG. 5 is an illustrative diagram for describing the overview of the information processing method according to the embodiment.

FIG. 5 is an illustrative diagram for describing the overview of the information processing method according to the present embodiment showing an example of a display state when the information processing method according to the present embodiment is used.

When the information processing method according to the present embodiment is used, a display state can be indicated by, for example, a combination of an angle of view of an image and a display direction of the image. To be specific, as angles of view of an image according to the present embodiment, for example, "landscape" (A1 and A2 of FIG. 5), "portrait" (B1 and B2 of FIG. 5), "pillar box" (C1 and C2 of FIG. 5), and "letter box" (D1 and D2 of FIG. 5) are exemplified. In addition, display directions of an image according to the present embodiment are expressed by direction modes corresponding to predetermined angles, for example, "normal" (A1, B1, C1, and D1 of FIG. 5) in which a rotation angle of an image is 0° and "reverse" (A2, B2, C2, and D2 of FIG. 5) in which a rotation angle of an image is 180°. Here, a predetermined angle corresponding to a direction mode according to the present embodiment may be a predefined fixed value, or a variable value that can be changed based on a user operation or the like. In addition, a rotation angle according to the present embodiment refers to, for example, an angle with respect to a reference direction such as a horizontal direction, and an angle in a predetermined direction such as counterclockwise direction may be indicated by a positive angle.

Note that the display direction of an image according to the present embodiment is not limited to the expression of the direction mode corresponding to a predetermined angle such as 180° as shown in FIG. 5.

For example, the display direction of an image according to the present embodiment can also be expressed by an arbitrary angle for defining a rotation angle of the image. When the display direction of an image according to the present embodiment is expressed by an angle, the angle is set based on a detection result of a sensor that can detect motions, for example, an acceleration sensor. Note that the angle setting method used when the display direction of an image according to the present embodiment is expressed by an angle is not limited to the above. When the display direction of an image according to the present embodiment is expressed by an angle, for example, the angle may be set based on an execution state or an execution result of an application. When the display direction according to the present embodiment is expressed by an angle, the display direction is more explicitly defined. Hereinbelow, a case in which the display direction of an image according to the present embodiment is expressed by the direction mode according to the present embodiment will be mainly exemplified.

Referring to FIG. 4, when the image being displayed by the smartphone on its display screen is changed between the state shown in A1 of FIG. 4 and the state shown in A2 of FIG. 4 as shown in A1 and A2 of FIG. 4, for example, the display apparatus rotates its display screen interlinked with the change of the image being displayed by the smartphone on its display screen. Accordingly, the display apparatus changes display of the image by displaying the image (image being displayed by the smartphone on its display screen) on its rotated display screen. Here, the rotation of the display screen of the display apparatus as shown in B1 and B2 of FIG. 4 can be realized by causing, for example, a display-mounting instrument which is based on a VESA (Video Electronics Standards Association) standard to be driven by a motor In the information processing system according to the present embodiment, the source device according to the present embodiment and the sink device according to the present embodiment perform a process relating to the information processing method according to the present embodiment as shown below to realize interlinking of an image displayed on the display screens of the devices as shown in, for example, FIGS. 3 and 4.

[2-1-1] Process Relating to the Information Processing Method According to the Present Embodiment Performed in the Source Device According to the Present Embodiment The source device according to the present embodiment performs, for example, a setting process and a communication control process shown below as a process relating to the information processing method according to the present embodiment.

(1) Setting Process

The source device according to the present embodiment sets an angle of view and a display direction of image data to be transmitted to the sink device according to the present embodiment, for example, in the range of an angle of view of a corresponding image and a display direction of the image of the sink device (transmission target device) according to the present embodiment to which the image data is transmitted.

To be more specific, for example, based on a "display state of an image represented by image data to be transmitted to the sink device according to the present embodiment on a display screen (hereinafter referred to as a 'display state according to the present embodiment') or a state of an application relating to reproduction of the image data (hereinafter referred to as a 'state of an application according to the present embodiment')" and "capability information with regard to the sink device according to the present embodiment," the source device according to the present embodiment sets an angle of view and a display direction of image data to be transmitted to the sink device according to the present embodiment in the range of an angle of view and a display direction represented by the capability information.

Here, the capability information according to the present embodiment is, for example, data representing an angle of view of an image that can be displayed and a display direction of the image. The source device according to the present embodiment obtains capability information with regard to the sink device according to the present embodiment by, for example, reading the capability information stored in a recording medium such as a storage unit (described later) or an external recording medium or by acquiring the capability information through communication with the sink device according to the present embodiment or an external device such as a server. A specific example of the capability information according to the present embodiment will be described below.

In the setting process according to the present embodiment, by setting an angle of view and a display direction of image data to be transmitted in the range of the angle of view and the display direction represented by the capability information with regard to the sink device according to the present embodiment, the image data to be transmitted to the sink device according to the present embodiment represents an angle of view and a display direction that can be displayed by the sink device according to the present embodiment.

In addition, in the setting process according to the present embodiment, the source device according to the present embodiment sets an angle of view and a display direction of image data to be transmitted to the sink device according to the present embodiment based on a "display state according to the present embodiment" or a "state of an application according to the present embodiment" as described above. As a display screen on which an image represented by the image data to be transmitted is displayed, for example, a display unit (described later) included in the source device according to the present embodiment, a display screen of an external display device connected to the source device according to the embodiment, a display screen of a display device included in an external apparatus, or the like is exemplified.

Here, when the source device according to the present embodiment performs a display control process of displaying an image represented by the image data to be transmitted on a display screen, for example, the source device specifies an angle of view and a display direction of the image being displayed on the display screen based on a result of the display control process performed by the device itself. In addition, when an external apparatus performs the display control process, for example, the source device according to the present embodiment specifies an angle of view and a display direction of the image being displayed on the display screen based on a result of the display control process performed by the external apparatus. The display control process is performed based on, for example, an orientation of a display screen specified based on a detection result of a sensor such as an acceleration sensor that can detect motions.

In addition, when the source device according to the present embodiment executes an application relating to reproduction of the image data to be transmitted, for example, the source device specifies an angle of view and a display direction of an image to be displayed on a display screen (or an image being displayed on a display screen) based on an execution state or an execution result of the application executed by the device itself. In addition, when an external apparatus executes the application relating to reproduction, the source device according to the present embodiment specifies an angle of view and a display direction of an image to be displayed on a display screen (or an image being displayed on a display screen) based on an execution state or an execution result of the application executed by the external apparatus. The execution state or the execution result of the application can be changed based on, for example, a detection result, a user operation, or the like of a sensor such as an acceleration sensor that can detect motions Thus, an angle of view and a display direction of image data to be transmitted to the sink device according to the present embodiment correspond to, for example, an angle of view and a display direction of an image being displayed on a display screen by the source device according to the present embodiment or an external apparatus" or "an angle of view and a display direction of an image to be displayed on a display screen (or an image being displayed on a display screen) by an application relating to reproduction executed by the source device according to the present embodiment or an external apparatus.

Note that, when an angle of view and a display direction specified based on a "display state according to the present embodiment" or a "state of an application according to the present embodiment" are not in the range of an angle of view and a display direction represented by the capability information with regard to the sink device according to the present embodiment, the source device according to the present embodiment sets an angle of view and a display direction, for example, in the range of the angle of view and the display direction represented by the capability information. Here, in such a case, the source device according to the present embodiment may set an angle of view and a display direction having higher priority based on priorities of the set angle and priorities of the display direction, or may set an angle of view and a display direction in the range of the angle of view and the display direction represented by the capability information at random.

As described above, the source device according to the present embodiment sets an angle of view and a display direction of the image data to be transmitted based on, for example, the "display state according to the present embodiment or state of the application according to the present embodiment" and the "capability information with regard to the sink device according to the present embodiment."

Here, as shown in A1 and A2 of FIG. 3 and A1 and A2 of FIG. 4, for example, after an angle of view and a display direction of the image data to be transmitted are set, a change can occur in the "display state according to the present embodiment" or the "state of the application according to the present embodiment." Thus, when the "display state according to the present embodiment or state of the application according to the present embodiment" is changed, the source device according to the present embodiment may re-set an angle of view and a display direction based on, for example a display state according to the present embodiment after the change or a state of the application according to the present embodiment after the change.

The source device according to the present embodiment performs, for example, the process described above as the setting process according to the present embodiment. Note that a specific example of the setting process according to the present embodiment will be described later.

(2) Communication Control Process

The source device according to the present embodiment causes setting information that includes an angle of view and a display direction set in the process of (1) described above (setting process) to be transmitted to the sink device according to the present embodiment (transmission target device). The source device according to the present embodiment causes, for example, a communication unit (described later) included in the device itself of a communication device connected thereto to transmit the setting information to the sink device according to the present embodiment.

Here, the setting information according to the present embodiment is data representing setting relating to the image data to be transmitted. A specific example of the setting information according to the present embodiment will be described later.

In addition, when an angle of view and a display direction are re-set in the process of (1) described above (setting process), the source device according to the present embodiment causes setting information that includes the re-set angle of view and display direction to be transmitted to the sink device according to the present embodiment.

Note that the communication control process according to the present embodiment is not limited to the process of transmitting the setting information.

For example, the source device according to the present embodiment may, for example, cause a transmission request for causing the sink device according to the present embodiment to transmit the capability information to be transmitted to the sink device according to the present embodiment as the communication control process according to the present embodiment. As the transmission request according to the present embodiment, for example, data that includes a transmission command of the capability information is exemplified. A specific example of the transmission request according to the present embodiment will be described later.

When the transmission request according to the present embodiment is transmitted, the source device according to the present embodiment sets an angle of view and a display direction in the process of (1) described above (setting process) based on the capability information transmitted from the sink device according to the present embodiment in response to the transmission request.

In addition, the source device according to the present embodiment may cause image data in accordance with setting represented by the setting information transmitted to the sink device according to the present embodiment (image data corresponding to the angle of view and the display direction set in the process of (1) described above (setting process)) to be transmitted to the sink device according to the present embodiment. Note that, by transmitting the setting information to be transmitted to the sink device according to the present embodiment to an external apparatus that will transmit the image data, the source device according to the present embodiment can also cause the external apparatus to transmit the image data in accordance with the setting represented by the setting information.

The source device according to the present embodiment performs the process of (1) described above (setting process) and the process of (2) described above (communication control process) as the process relating to the information processing method according to the present embodiment.

Here, the source device according to the present embodiment causes the setting information that includes the angle of view and the display direction set in the process of (1) described above (setting process) to be transmitted to the sink device according to the present embodiment in the process of (2) described above (communication control process). In addition, in the process of (1) described above (setting process), the angle of view and the display direction of the image data to be transmitted are set in the range of the angle of view and the display direction represented by the capability information based on the "display state according to the present embodiment or state of the application according to the present embodiment" and the "capability information with regard to the sink device according to the present embodiment." In other words, when the sink device according to the present embodiment causes an image represented by the received image data to be displayed on its display screen, the image is an image having an angle of view and a display direction that can be displayed by the sink device according to the present embodiment. In addition, when the sink device according to the present embodiment causes the image represented by the received image data to be displayed on its display screen, the image is highly likely to correspond to "an angle of view and a display direction of an image being displayed on the display screen by the source device according to the present embodiment or an external apparatus" or "an angle of view and a display direction of an image displayed on the display screen (or an image being displayed on a display screen) by an application relating to reproduction executed by the source device according to the present embodiment or an external apparatus."

Therefore, as the source device according to the present embodiment performs the process of (1) described above (setting process) and the process of (2) described above (communication control process), the information processing system that can interlink an image displayed on the display screens between devices can be realized.

[2-1-2] Process Relating to the Information Processing Method According to the Present Embodiment Performed in the Sink Device According to the Present Embodiment The sink device according to the present embodiment performs, for example, a display control process shown below as a process relating to the information processing method according to the present embodiment.

(i) Display Control Process

The sink device according to the present embodiment causes the image represented by the received image data to be displayed on a display screen based on the received setting information. The sink device according to the present embodiment performs communication with an external apparatus such as the source device according to the present embodiment via a communication unit (described later) included in the sink device or an external communication device connected thereto to receive the setting information, the image data, and the like.

As a display screen on which the image represented by the image data is displayed by the sink device according to the present embodiment, for example, a display unit (described later) included in the sink device according to the present embodiment, a display screen of an external display device connected to the sink device according to the present embodiment, a display screen of a display device included in an external apparatus, or the like is exemplified. The sink device according to the present embodiment causes the image represented by the image data to be displayed on the display screen by, for example, transferring a control signal for controlling display and the image data to the display unit (described later).

To be more specific, the sink device according to the present embodiment causes the image represented by the image data to be displayed on the display screen according to the angle of view and the display direction represented by the setting information.

As a display method of the image represented by the image data according to the present embodiment, for example, the case in which the image represented by the image data is window-displayed on a display screen according to an angle of view and a display direction represented by the setting information as shown in B1 and B2 of FIG. 3 is exemplified.

Note that the display method of the image represented by the image data according to the present embodiment is not limited to the above.

For example, the sink device according to the present embodiment may rotate a display screen of a display device such as a display device constituting the display unit (described later) so as to correspond to the display direction represented by the setting information as shown in B1 and B2 of FIG. 4. When the display screen of the display device is rotated so as to correspond to the display direction represented by the setting information, the sink device according to the present embodiment causes the image represented by the image data to be displayed on the display screen according to the angle represented by the setting information.

Here, as described above, the setting information according to the present embodiment includes an angle of view and a display direction in the range of the angle of view of an image and a display direction of an image corresponding to the sink device according to the present embodiment. In addition, the angle of view and the display direction included in the setting information according to the present embodiment are highly likely to correspond to "an angle of view and a display direction of an image being displayed on a display screen by the source device according to the present embodiment or an external apparatus" or "an angle of view and a display direction of an image displayed on a display screen (or an image being displayed on a display screen) by an application relating to reproduction executed by the source device according to the present embodiment or an external apparatus."

Therefore, as the sink device according to the present embodiment performs the process of (i) described above (display control process), the information processing system that can interlink an image displayed on display screens between devices can be realized.

In the information processing system according to the present embodiment, the process described above is performed by the source device according to the present embodiment and the sink device according to the present embodiment as the process relating to the information processing method according to the present embodiment.

[2-2] Examples of the Process Relating to the Information Processing Method According to the Present Embodiment Next, specific examples of the process relating to the information processing method according to the present embodiment performed in the information processing system according to the present embodiment will be shown. Hereinafter, the specific examples of the process relating to the information processing method according to the present embodiment will be shown exemplifying a case in which the process relating to the information processing method according to the present embodiment is applied to Wi-Fi MIRACAST.

In addition, hereinafter, a case in which the information processing system according to the present embodiment has a source device 100 according to the present embodiment and a sink device 200 according to the present embodiment and each of the source device 100 and the sink device 200 performs the process relating to the information processing method according to the present embodiment described above will be exemplified.

Figure 6:
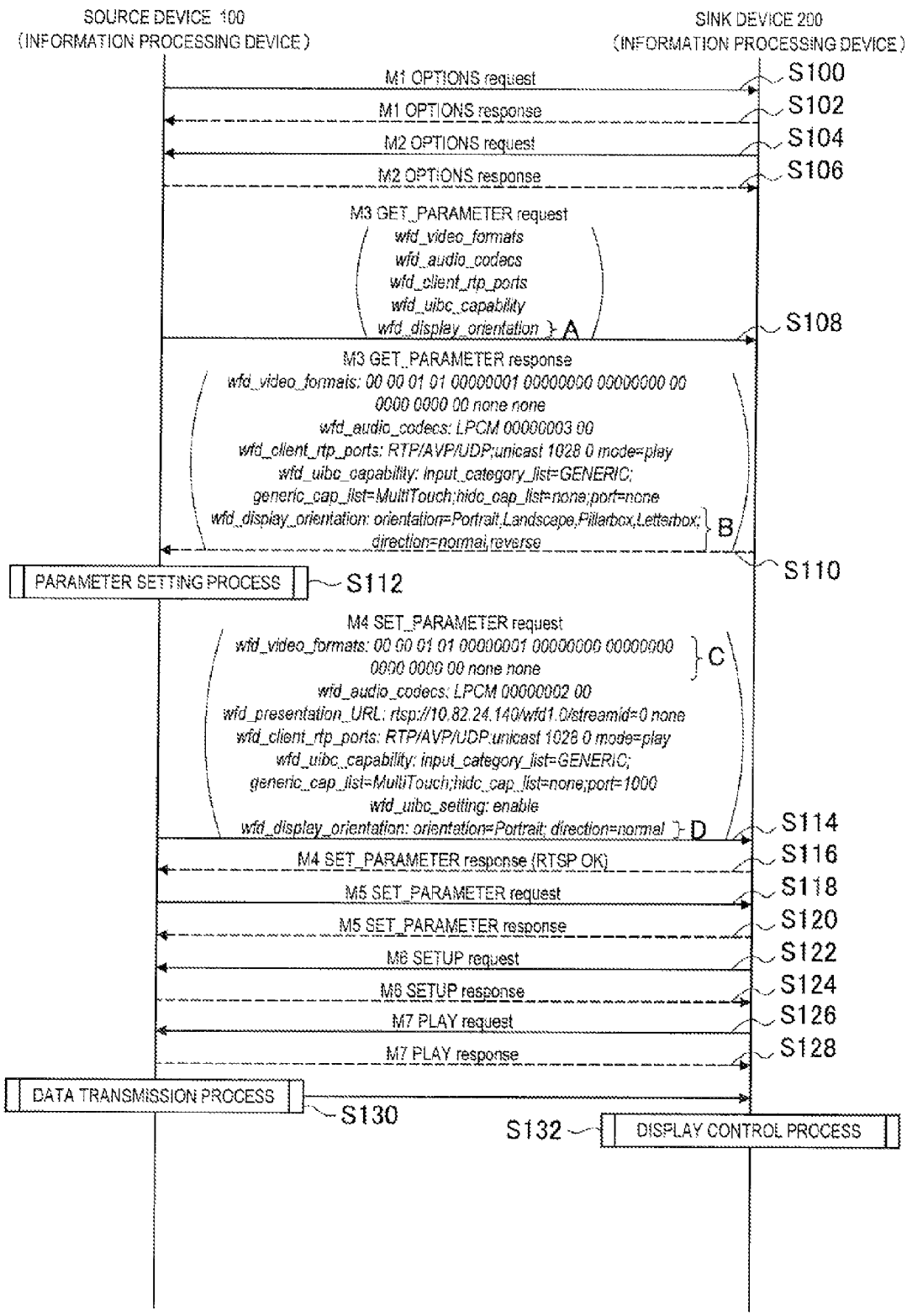
FIG. 6 is a descriptive diagram showing a first example of a process relating to the information processing method according to the embodiment.

[2-2-1] First Example of the Process Relating to the Information Processing Method According to the Present Embodiment FIG. 6 is a descriptive diagram showing a first example of the process relating to the information processing method according to the present embodiment. For example, the process of Step S112 shown in FIG. 6 corresponds to the process of (1) described above (setting process). In addition, the processes of Steps S108, S114, and S130 shown in FIG. 6 correspond to the process of (2) described above (communication control process). Furthermore, for example, the process of Step S132 shown in FIG. 6 corresponds to the process of (i) described above (display control process). Note that a specific example of the process of Step S112 will be described with reference to FIG. 7, and a specific example of the process of Steps S130 will be described with reference to FIGS. 8 and 9. In addition, a specific example of the process of Steps S132 will be described with reference to FIGS. 10 through 13.

Here, FIG. 6 shows an example of the process performed when communication is performed between the source device 100 and the sink device 200 based on the RTSP in the same manner as in an example of a process performed when Wi-Fi MIRACAST shown in FIG. 1 is used. To be specific, the processes of Steps S100 to S106 shown in FIG. 6 correspond to the processes of Steps S10 to S16 shown in FIG. 1. In addition, the processes of Steps S108 to S128 shown in FIG. 6 correspond to the "Capability Negotiation" shown in FIG. 1. Furthermore, the process of Step S130 shown in FIG. 6 corresponds to the process of Step S38 shown in FIG. 1, and the process of Step S132 shown in FIG. 6 corresponds to the process of Step S40 shown in FIG. 1.

As one method for applying the process relating to the information processing method according to the present embodiment to communication based on the existing RTSP as shown in FIG. 1, for example, resolution of a vertically long angle of view is considered to be added to the resolution item in information exchanged between the source device and the sink device in the communication based on the existing RTSP.

However, in the communication based on the existing RTSP as shown in FIG. 1, standards of, for example, MPEG-4/AVC, CEA (Consumer Electronics Association), VESA, and the like are referred to for the image resolution item. Thus, simply adding resolution of a vertically long angle of view to the resolution item in information exchanged between the source device and the sink device is not desirable in light of, for example, influence on the standards described above, or maintenance of compatibility with MIRACAST itself.

Thus, as shown in D of FIG. 6, for example, the source device 100 adds a new field at the time of the "Capability Negotiation" using the RTSP, and transfers an angle of view and a display direction of an image represented by image data to be transmitted to the sink device 200 (which correspond to, for example, an image displayed on a display screen by the source device 100) to the sink device 200. In other words, in the example shown in FIG. 6, "M4 SET_PARAMETER request" that includes the field shown in D of FIG. 6 corresponds to the setting information according to the present embodiment.

As a new field name as shown in D of FIG. 6, for example, an arbitrary field name that is not defined in Wi-Fi MIRACAST is exemplified.

Here, a field with a field name not defined in Wi-Fi MIRACAST is ignored in a system that is not capable of interpreting the field based on the RTSP and Wi-Fi MIRACAST. Thus, by giving an arbitrary field name not defined in Wi-Fi MIRACAST as a new field name as shown in D of FIG. 6, for example, compatibility with Wi-Fi MIRACAST can be maintained.

In addition, when an angle of view and a display direction of image data transmitted to the sink device 200 are transferred by the new field as shown in D of FIG. 6, for example, it is not necessary to edit a resolution item defined by standards of MPEG-4/AVC, CEA, VESA, and the like referred to in Wi-Fi MIRACAST.

Therefore, when an angle of view and a display direction of image data transmitted to the sink device 200 are transferred by the new field as shown in D of FIG. 6, for example, it is possible to prevent influence on the standards such as MPEG-4/AVC and the like and to maintain compatibility with MIRACAST.

Hereinafter, the process relating to the information processing method according to the present embodiment of the first example shown in FIG. 6 will be described. In the process shown in FIG. 6, processes different from the process shown in FIG. 1, i.e., the process relating to the information processing method according to the present embodiment, will be described hereinbelow.

When the processes of Steps S100 to S106 are performed, the source device 100 transmits "M3 GET_PARAMETER request" that includes a transmission request shown in A of FIG. 6 to the sink device 200 (S108). Here, the transmission request according to the present embodiment is defined with an arbitrary field name not defined in Wi-Fi MIRACAST in "M3 GET_PARAMETER request."

The sink device 200 that has received the transmission request from the source device 100 in Step S108 transmits "M3 GET_PARAMETER response" that includes capability information shown in B of FIG. 6 to the source device 100 (S110). Here, the capability information according to the present embodiment is defined with an arbitrary field name not defined in Wi-Fi MIRACAST in "M3 GET_PARAMETER response." In the example shown in FIG. 6, an angle is denoted by "orientation=" and a display direction is denoted by "direction=" in the capability information.

The source device 100 that has received the capability information transmitted from the sink device 200 in Step S110 sets parameters (a parameter setting process of Step S112).

<An Example of the Parameter Setting Process in the Source Device 100>

Figure 7:
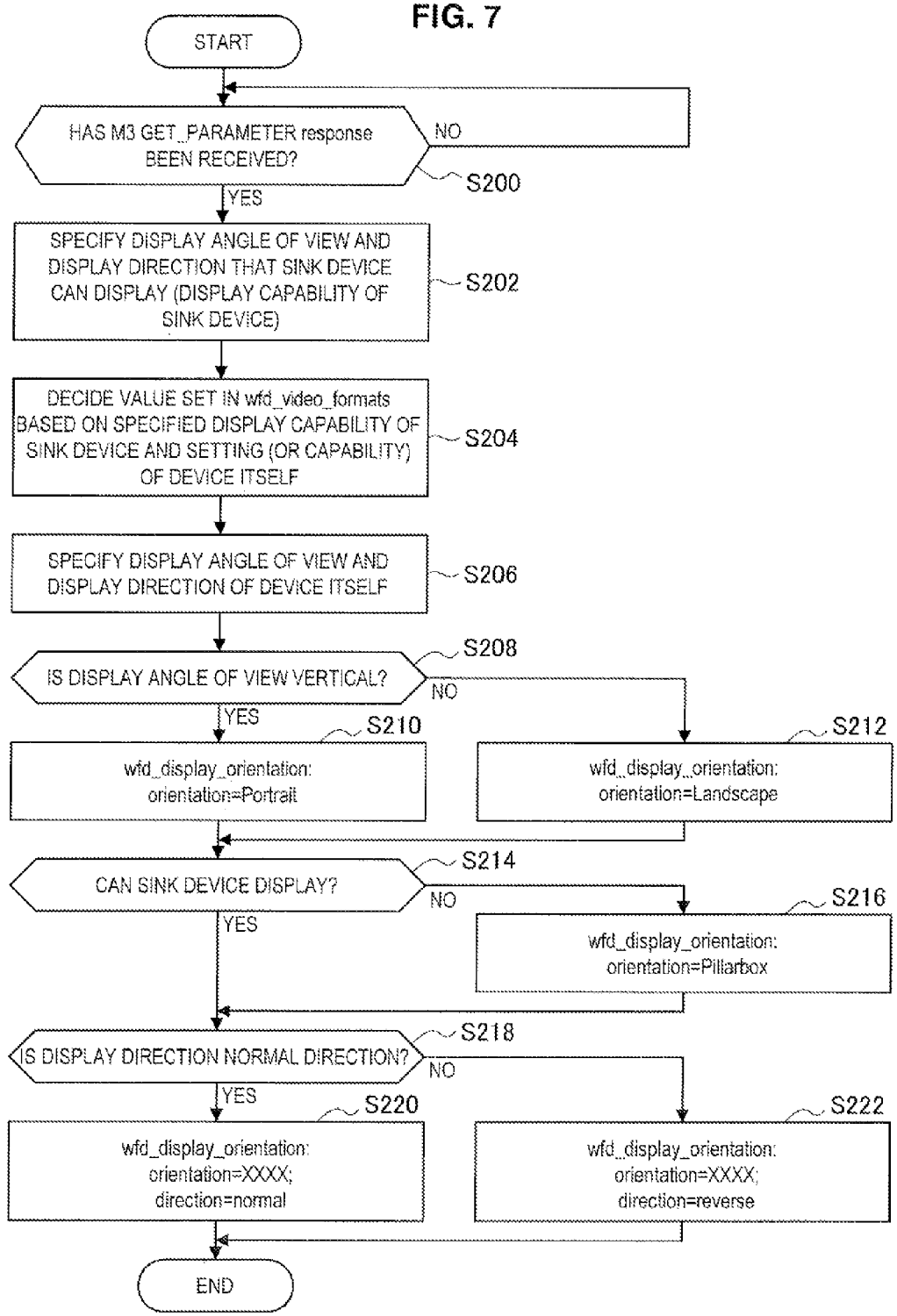
FIG. 7 is a flowchart showing an example of a parameter setting process performed in a source device according to the embodiment.

FIG. 7 is a flowchart showing an example of the parameter setting process performed in the source device 100 according to the present embodiment. Herein, FIG. 7 shows an example of the parameter setting process performed when the source device 100 causes an image represented by image data transmitted to the sink device 200 to be displayed on a display screen of the display unit (described later) included in the source device 100.

The source device 100 determines whether or not "M3 GET_PARAMETER response" is acquired (S200). When "M3 GET_PARAMETER response" is determined not to have been acquired in Step S200, the source device 100 does not allow the process to proceed until "M3 GET_PARAMETER response" is determined to have been acquired.

When "M3 GET_PARAMETER response" is determined to have been acquired in Step S200, the source device 100 specifies a display angle of view and a display direction that can be displayed by the sink device 200 (may be referred to hereinafter as "display capability of the sink device 200") based on the capability information included in "M3 GET_PARAMETER response" (S202).

The source device 100 decides a value set in "vfd_video_formats" shown in C of FIG. 6 based on, for example, the display capability of the sink device 200 specified in Step S202 and setting (or capability) of the source device itself (S204).

The source device 100 specifies a display angle of view and a display direction of the device itself (S206). The source device 100 specifies the display angle of view and the display direction based on, for example, the display state according to the present embodiment or the state of the application according to the present embodiment. Then, the source device 100 determines whether or not the display angle of view specified in Step S206 is a vertically long angle of view (S208).

When the display angle of view is determined to be a vertically long angle of view in Step S208, the source device 100 sets "portrait" as an angle of view (S210). In addition, when the display angle of view is determined not to be a vertically long angle of view in Step S208, the source device 100 sets "landscape" as an angle of view (S212).

When the process of Step S210 or S212 is performed, the source device 100 determines whether the angle of view can be displayed by the sink device 200 based on the capability information (S214).

When the sink device 200 is determined not to be capable of displaying the angle of view in Step S214, the source device 100 sets "pillar box" as an angle of view (S216).

When the sink device 200 is determined to be capable of displaying the angle of view in Step S214 or when the process of Step S216 is performed, the source device 100 determines whether or not the display direction is a normal direction (which corresponds to a normal direction shown in FIG. 5 (S218)).

When the display direction is determined to be a normal direction in Step S218, the source device 100 sets "normal" as a display direction (S220). In addition, when the display direction is determined not to be a normal direction in Step S218, the source device 100 sets "reverse" as a display direction (S222).

The source device 100 performs the process shown in, for example, FIG. 7 as the parameter setting process shown in Step S112 of FIG. 6.

Note that the parameter setting process according to the present embodiment is not limited to the example shown in FIG. 7.

When the display direction according to the present embodiment is expressed by an angle, for example, the source device 100 may specify an angle corresponding to the display direction and set the specified angle as the display direction instead of performing the processes of Steps S218 to S220 shown in FIG. 7.

The first example of the process relating to the information processing method according to the present embodiment will be described referring to FIG. 6 again. The source device 100 transmits "M4 SET_PARAMETER request" that includes the parameters set in the process of Step S112 to the sink device 200 (S114).

When "M4 SET_PARAMETER request" is transmitted from the source device 100 to the sink device 200 in Step S114, processes the same as those of Steps S24 to S36 shown in FIG. 1 are performed between the source device 100 and the sink device 200 (Steps S116 to S128).

When the processes of Steps S116 to S128 are performed, the source device 100 transmits, to the sink device 200, image data in accordance with setting represented by the setting information transmitted to the sink device 200 (a data transmission process of S130).

<An Example of the Data Transmission Process in the Source Device 100>

Figure 8:
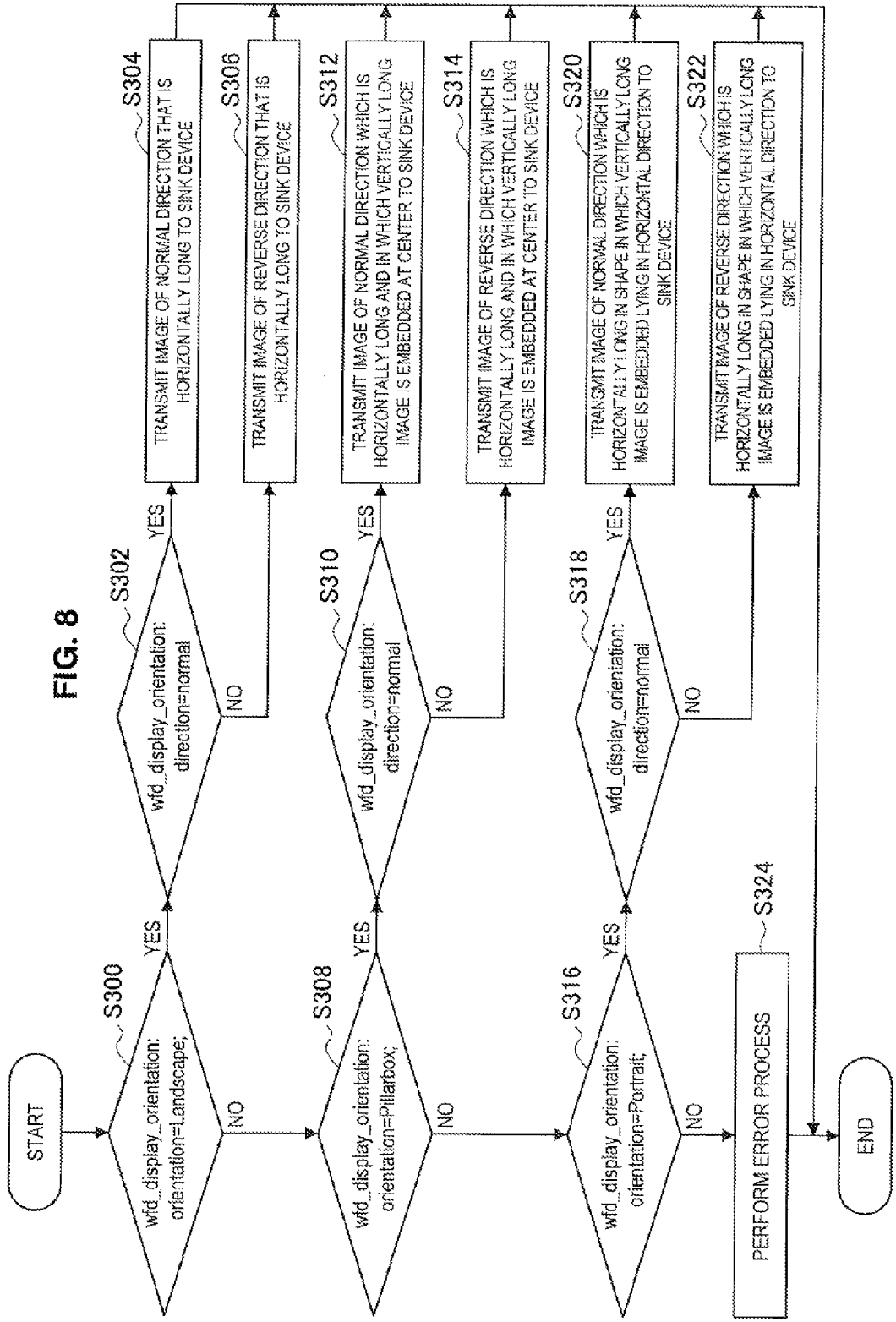
FIG. 8 is a flowchart showing an example of a data transmission process performed in the source device according to the embodiment.

FIG. 8 is a flowchart showing an example of the data transmission process performed in the source device 100 according to the present embodiment. In addition, FIG. 9 is an illustrative diagram for describing the example of the data transmission process performed in the source device 100 according to the present embodiment, showing an example of an image represented by image data transmitted from the source device 100. Herein, FIG. 9 shows an example in which resolution of the image represented by the image data is 1920×1080, but resolution of an image represented by image data according to the present embodiment is not limited to 1920×1080. For example, as resolution of an image represented by image data according to the present embodiment, arbitrary resolution is exemplified.

The source device 100 determines whether or not the angle of view set in the setting information is "landscape" (S300).

When the angle of view set in the setting information is determined to be "landscape" in Step S300, the source device 100 determines whether or not the display direction set in the setting information is "normal" (S302).

When the display direction set in the setting information is determined to be "normal" in Step S302, image data representing an image that is horizontally long in the normal direction as shown in, for example, A of FIG. 9 is transmitted to the sink device 200 (S304). Then, the source device 100 ends the data transmission process.

In addition, when the display direction set in the setting information is determined not to be "normal" in Step S302, image data representing an image that is horizontally long in a reverse direction as shown in, for example B of FIG. 9 is transmitted to the sink device 200 (S306). Then, the source device 100 ends the data transmission process.

When the angle of view set in the setting information is determined not to be "landscape" in Step S300, the source device 100 determines whether or not the angle of view set in the setting information is "pillar box" (S308).

When the angle of view set in the setting information is determined to be "pillar box" in Step S308, the source device 100 determines whether or not the display direction set in the setting information is "normal" (S310).

When the display direction set in the setting information is determined to be "normal" in Step S310, image data representing an image in a normal direction which is horizontally long and in which a vertically long image is embedded at the center as shown in, for example, C of FIG. 9 is transmitted to the sink device 200 (S312). Then, the source device 100 ends the data transmission process.

In addition, when the display direction set in the setting information is determined not to be "normal" in Step S310, image data representing an image of a reverse direction which is horizontally long and in which a vertically long image is embedded at the center as shown in, for example, D of FIG. 9 is transmitted to the sink device 200 (S314). Then, the source device 100 ends the data transmission process.

When the angle of view set in the setting information is determined not to be "pillar box" in Step S308, the source device 100 determines whether or not the angle of view set in the setting information is "portrait" (S316).

When the angle of view set in the setting information is determined to be "portrait" in Step S316, the source device 100 determines whether or not the display direction set in the setting information is "normal" (S318).

When the display direction set in the setting information is determined to be "normal" in Step S318, image data representing an image of a normal direction which is horizontally long in the shape in which a vertically long image is embedded lying in the horizontal direction as shown in, for example, E of FIG. 9 is transmitted to the sink device 200 (S320). Then, the source device 100 ends the data transmission process.

In addition, when the display direction set in the setting information is determined not to be "normal" in Step S318, image data representing an image of a reverse direction which is horizontally long in the shape in which a vertically long image is embedded lying in the horizontal direction as shown in, for example, F of FIG. 9 is transmitted to the sink device 200 (S322). Then, the source device 100 ends the data transmission process.

When the angle of view set in the setting information is determined not to be "portrait" in Step S316, the source device 100 performs an error process (S324). Here, as the error process according to the present embodiment, for example, a process of notifying a user of the source device 100, a user of the sink device 200, or the like of an error indicating that the image data is not transmitted (for example, a visual notification using text, an image, lighting of a lamp or the like, audio notification using a sound, or the like) is exemplified. Then, the source device 100 ends the data transmission process.

The source device 100 performs, for example the process shown in FIG. 8 as the data transmission process shown in Step S130 of FIG. 6.

Note that the data transmission process according to the present embodiment is not limited to the example shown in FIG. 8.

For example, the source device 100 may perform the processes of Steps S300, S308, and S316 of FIG. 8 in an arbitrary order.

In addition, the source device 100 can also transmit audio data representing a sound corresponding to an image represented by image data together, and is not limited to such image data as described above.

The first example of the process relating to the information processing method according to the present embodiment will be described with reference to FIG. 6 again. The sink device 200 that has received the image data transmitted from the source device 100 in Step S130 causes the image represented by the image data to be displayed on the display screen based on the setting information acquired in Step S114 (a display control process of S132).

<An Example of the Display Control Process in the Sink Device 200>

Figure 10:
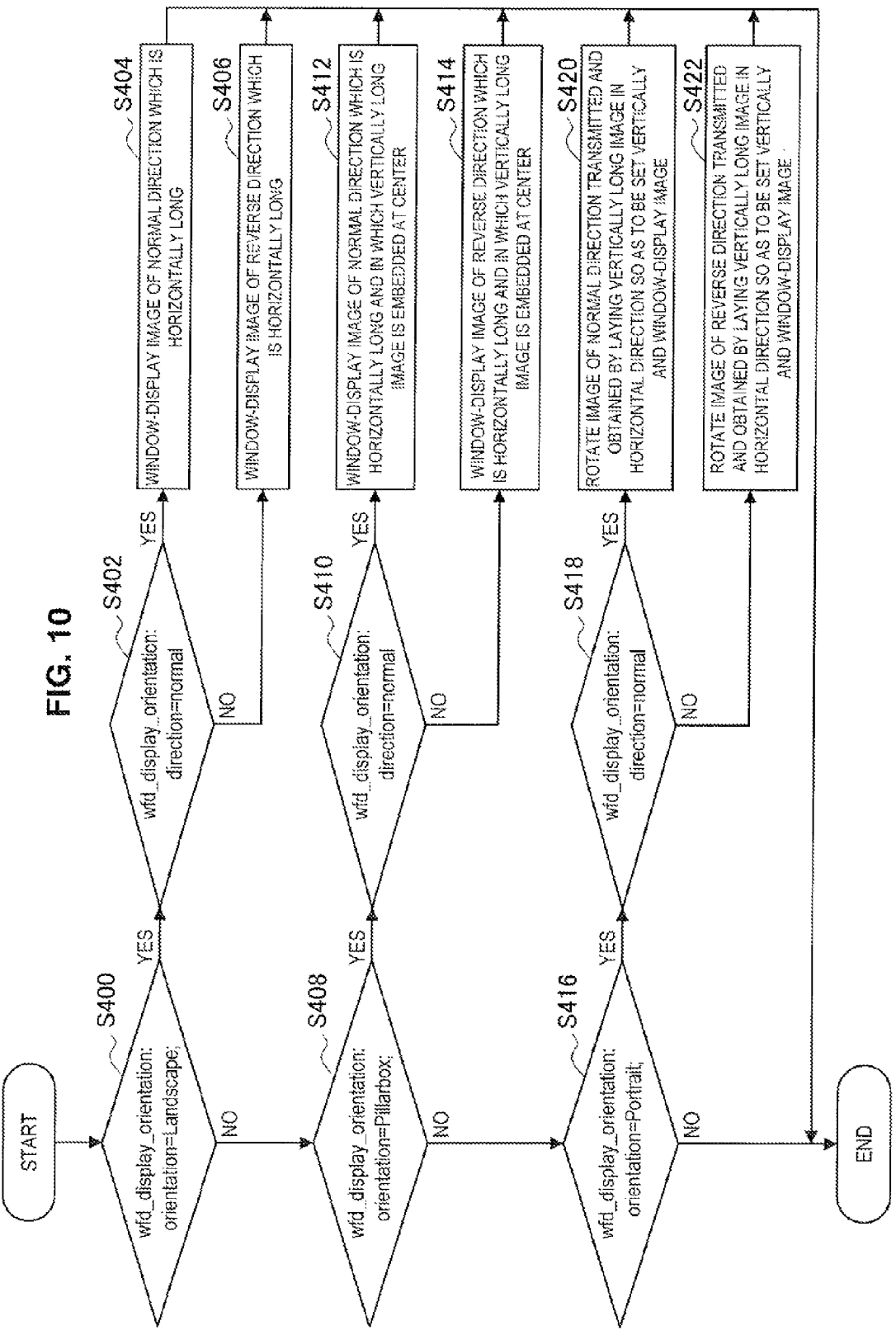
FIG. 10 is a flowchart showing a first example of a display control process performed in a sink device according to the embodiment.
Figure 11:
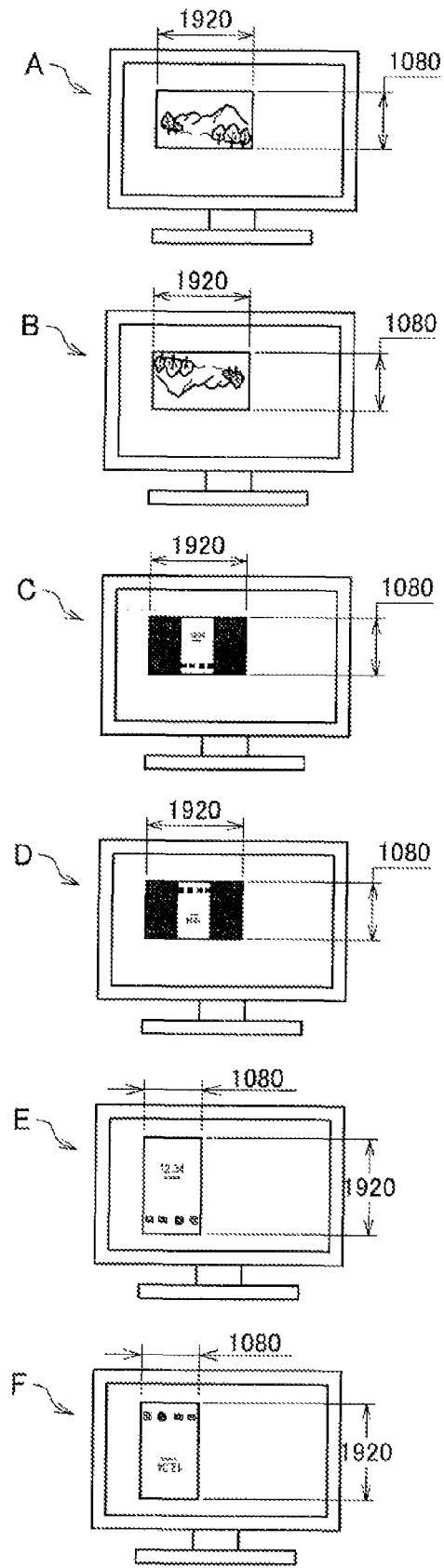
FIG. 11 is an illustrative diagram for describing the first example of the display control process performed in the sink device according to the embodiment.

FIG. 10 is a flowchart showing a first example of the display control process performed in the sink device 200 according to the present embodiment. In addition, FIG. 11 is an illustrative diagram for describing the first example of the display control process performed in the sink device 200 according to the present embodiment. Herein, FIGS. 10 and 11 shows the display control process according to the first example in which the sink device 200 causes an image represented by image data to be window-displayed within a display screen in accordance with an angle of view and a display direction represented by setting information as shown in, for example, B1 and B2 of FIG. 3. Herein, FIG. 11 shows an example in which resolution of the image represented by the image data is 1920×1080 or 1080×1920, but resolution of an image represented by image data according to the present embodiment is not limited to 1920×1080 or 1080×1920. For example, as resolution of an image represented by image data according to the present embodiment, arbitrary resolution is exemplified as described above.

The sink device 200 determines whether or not an angle of view set in the setting information is "landscape" (S400).

When the angle of view set in the setting information is determined to be "landscape" in Step S400, the sink device 200 determines whether or not the display direction set in the setting information is "normal" (S402).

When the display direction set in the setting information is determined to be "normal" in Step S402, an image of a normal direction that is horizontally long as shown in, for example, A of FIG. 11 is window-displayed within the display screen (S404). Then, the sink device 200 ends the display control process.

In addition, when the display direction set in the setting information is determined not to be "normal" in Step S402, an image of a reverse direction that is horizontally long as shown in, for example, B of FIG. 11 is window-displayed within the display screen (S404). Then, the sink device 200 ends the display control process.

When the angle of view set in the setting information is determined not to be "landscape" in Step S400, the sink device 200 determines whether or not the angle of view set in the setting information is "pillar box" (S408).

When the angle of view set in the setting information is determined to be "pillar box" in Step S408, the sink device 200 determines whether or not the display direction set in the setting information is "normal" (S410).

When the display direction set in the setting information is determined to be "normal" in Step S410, an image of a normal direction which is horizontally long and in which a vertically long image is embedded at the center as shown in, for example, C of FIG. 11 is window-displayed within the display screen (S412). Then, the sink device 200 ends the display control process.

In addition, when the display direction set in the setting information is determined not to be "normal" in Step S410, an image of a reverse direction which is horizontally long and in which a vertically long image is embedded at the center as shown in, for example, D of FIG. 11 is window-displayed within the display screen (S414). Then, the sink device 200 ends the display control process.

When the angle of view set in the setting information is determined not to be "pillar box" in Step S408, the sink device 200 determines whether or not the angle of view set in the setting information is "portrait" (S416).

When the angle of view set in the setting information is determined to be "portrait" in Step S416, the sink device 200 determines whether or not the display direction set in the setting information is "normal" (S418).

When the display direction set in the setting information is determined to be "normal" in Step S418, an image of a normal direction obtained through laying of a vertically long image in the horizontal direction and transmission is rotated so as to be set vertically and then window-displayed within the display screen as shown in, for example, E of FIG. 11 (S420). Then, the sink device 200 ends the display control process.

In addition, when the display direction set in the setting information is determined not to be "normal" in Step S418, an image of a reverse direction obtained through laying of a vertically long image in the horizontal direction and transmission is rotated so as to be set vertically and then window-displayed within the display screen as shown in, for example, F of FIG. 11 (S422). Then, the sink device 200 ends the display control process.

The sink device 200 performs the process shown in, for example, FIG. 10 as the display control process shown in Step S132 of FIG. 6.

Note that the display control process according to the present embodiment is not limited to the process according to the first example shown in FIG. 10.

Figure 12:
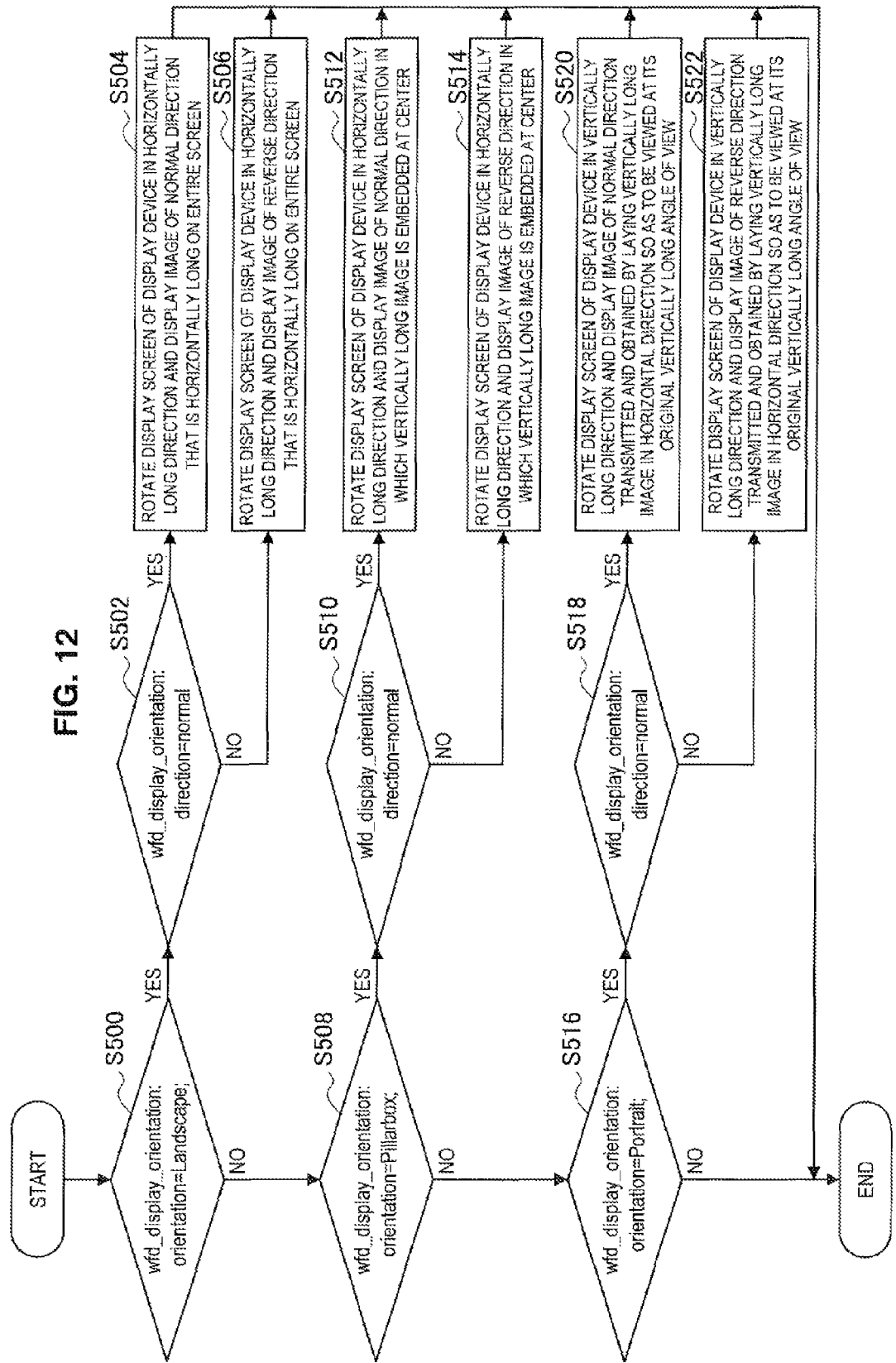
FIG. 12 is a flowchart showing a second example of the display control process performed in the sink device according to the embodiment.

FIG. 12 is a flowchart showing a second example of the display control process performed in the sink device 200 according to the present embodiment. In addition, FIG. 13 is an illustrative diagram for describing the second example of the display control process performed in the sink device 200 according to the present embodiment. Herein, FIGS. 12 and 13 show an example of the display control process according to the second example in which the sink device 200 "rotates a display screen of a display device so as to correspond to a display direction represented by setting information and according to an angle of view represented by setting information, to display an image represented by image data on the display screen," as shown in, for example, B1 and B2 of FIG. 4. Herein, FIG. 13 shows an example in which resolution of the display screen is 1920×1080 or 1080×1920, but resolution of the display screen according to the present embodiment is not limited to 1920×1080 or 1080×1920. For example, as resolution of a display screen according to the present embodiment, arbitrary resolution is exemplified.

The sink device 200 determines whether or not an angle of view set in the setting information is "landscape" (S500).

When the angle of view set in the setting information is determined to be "landscape" in Step S500, the sink device 200 determines whether or not a display direction set in the setting information is "normal" (S502).

When the display direction set in the setting information is determined to be "normal" in Step S502, the display screen of the display device is rotated so as to be in a horizontally long direction and an image of a normal direction that is horizontally long is displayed on the entire screen as shown in, for example, A of FIG. 13 (S504). Then, the sink device 200 ends the display control process.

In addition, when the display direction set in the setting information is determined not to be "normal" in Step S502, the display screen of the display device is rotated so as to be in the horizontally long direction and a display in a reverse direction that is horizontally long is displayed on the entire screen as shown in, for example, B of FIG. 13 (S506). Then, the sink device 200 ends the display control process.

When the angle of view set in the setting information is determined not to be "landscape" in Step S500, the sink device 200 determines whether or not the angle of view set in the setting information is "pillar box" (S508).

When the angle of view set in the setting information is determined to be "pillar box" in Step S508, the sink device 200 determines whether or not the display direction set in the setting information is "normal" (S510).

When the display direction set in the setting information is determined to be "normal" in Step S510, the display screen of the display device is rotated so as to be in the horizontally long direction and an image of a normal direction in which a vertically long image is embedded at the center as shown in, for example, C of FIG. 13 is displayed (S512). Then, the sink device 200 ends the display control process.

When the display direction set in the setting information is determined not to be "normal" in Step S510, the display screen of the display device is rotated so as to be in the horizontally long direction and an image of a reverse direction in which a vertically long image is embedded at the center as shown in, for example, D of FIG. 13 is displayed (S514). Then, the sink device 200 ends the display control process.

When the angle of view set in the setting information is determined not to be "pillar box" in Step S508, the sink device 200 determines whether or not the angle of view set in the setting information is "portrait" (S516).

When the angle of view set in the setting information is determined to be "portrait" in Step S516, the sink device 200 determines whether or not the display direction set in the setting information is "normal" (S518).

When the display direction set in the setting information is determined to be "normal" in Step S518, the display screen of the display device is rotated so as to be in the vertically long direction and an image of a normal direction obtained by laying of a vertically long image in the horizontal direction and transmission is displayed so as to be at its original vertically long angle of view as shown in, for example, E of FIG. 13 (S520). Then, the sink device 200 ends the display control process.

In addition, when the display direction set in the setting information is determined not to be "normal" in Step S518, the display screen of the display device is rotated so as to be in the vertically long direction and an image of a reverse direction obtained by laying of a vertically long image in the horizontal direction and transmission is displayed so as to be at its original vertically long angle of view as shown in, for example, F of FIG. 13 (S522). Then, the sink device 200 ends the display control process.

The sink device 200 can also perform the process shown in, for example, FIG. 12 as the display control process shown in S132 of FIG. 6.

Note that the display control process according to the present embodiment is not limited to the process according to the first example shown in FIG. 10 and the process according to the second example shown in FIG. 12.

For example, the sink device 200 may perform the processes of Steps S400, S408, and S416 of FIG. 10 and the processes of Steps S500, S508, and S516 of FIG. 12 in an arbitrary order.

In addition, when a display direction according to the present embodiment is expressed by an angle, the sink device 200, for example, causes an image corresponding to each angle of view to be window-displayed within a display screen at an angle corresponding to the display direction, instead of performing the processes of Steps S402 to S406, S410 to S414, and S418 to S422 shown in FIG. 10. In addition, when a display direction according to the present embodiment is expressed by an angle, the sink device 200, for example, causes a display screen of a display device to be rotated so as to be at the angle corresponding to the display direction and an image corresponding to each angle of view to be displayed on a display screen, instead of performing the processes of Steps S502 to S506, S510 to S514, and S518 to S522 shown in FIG. 12.

In addition, as described above, the source device 100 can also transmit audio data representing sounds corresponding to an image represented by image data together in Step S130 of FIG. 6. When audio data is received, the sink device 200 may further process the audio data to output sounds represented by the audio data from an audio output device.

In the information processing system according to the present embodiment, as the process relating to the information processing method according to the present embodiment, for example, the process shown in FIG. 6 is performed.

Herein, in the process according to the first example shown in FIG. 6, the source device 100 transmits the setting information that includes an angle of view and a display direction set in Step S112 that corresponds to the process of (1) described above (setting process) to the sink device 200 in Step S114 that corresponds to the process of (2) described above (communication control process). In addition, in the process according to the first example shown in FIG. 6, the sink device 200 causes an image represented by image data to be displayed on a display screen based on the received setting information in Step S132 that corresponds to the process of (i) described above (display control process).

Therefore, by performing the process according to the first example shown in FIG. 6, the image displayed on the display device can be interlinked between devices. To exemplify a specific example, by performing the process according to the first example shown in FIG. 6, for example, the source device 100 (or an external apparatus of which a display screen displays an image) can cause the sink device 200 to perform display according to an orientation such as vertical-horizontal, left-right, upward-downward, and the like.

In addition, by performing the process according to the first example shown in FIG. 6, the image displayed on the display screens is interlinked between the devices, and thus it is possible to more effectively use pixels and a display area that the display device has. Furthermore, by causing the display area of the display device to be more effectively used, visibility of the image displayed on the display screen of the display device can be enhanced.

Furthermore, in the process according to the first example shown in FIG. 6, information (data) relating to the information processing method according to the present embodiment such as the capability information and the setting information is exchanged between the source device 100 and the sink device 200 using fields with field names not defined in Wi-Fi MIRACAST. Thus, by performing the process according to the first example shown in FIG. 6, it is possible to add a new function to the information processing system while securing compatibility with the existing Wi-Fi MIRACAST and without changing the standards of H.264/AVC, VESA, CEA, and the like.

[2-2-2] Second Example of the Process Relating to the Information Processing Method According to the Present Embodiment Note that the process relating to the information processing method according to the present embodiment is not limited to the process according to the first example. After an angle of view and a display direction of transmitted image data are set as shown in, for example A1 and A2 of FIG. 3 and A1 and A2 of FIG. 4, a change can occur in a "display state according to the present embodiment" or a "state of an application according to the present embodiment." Thus, next, as a second example of the process relating to the information processing method according to the present embodiment, an example of a process performed when a "display state according to the present embodiment" or a "state of an application according to the present embodiment" is changed after the process according to the first example shown in FIG. 6 will be described.

Figure 14:
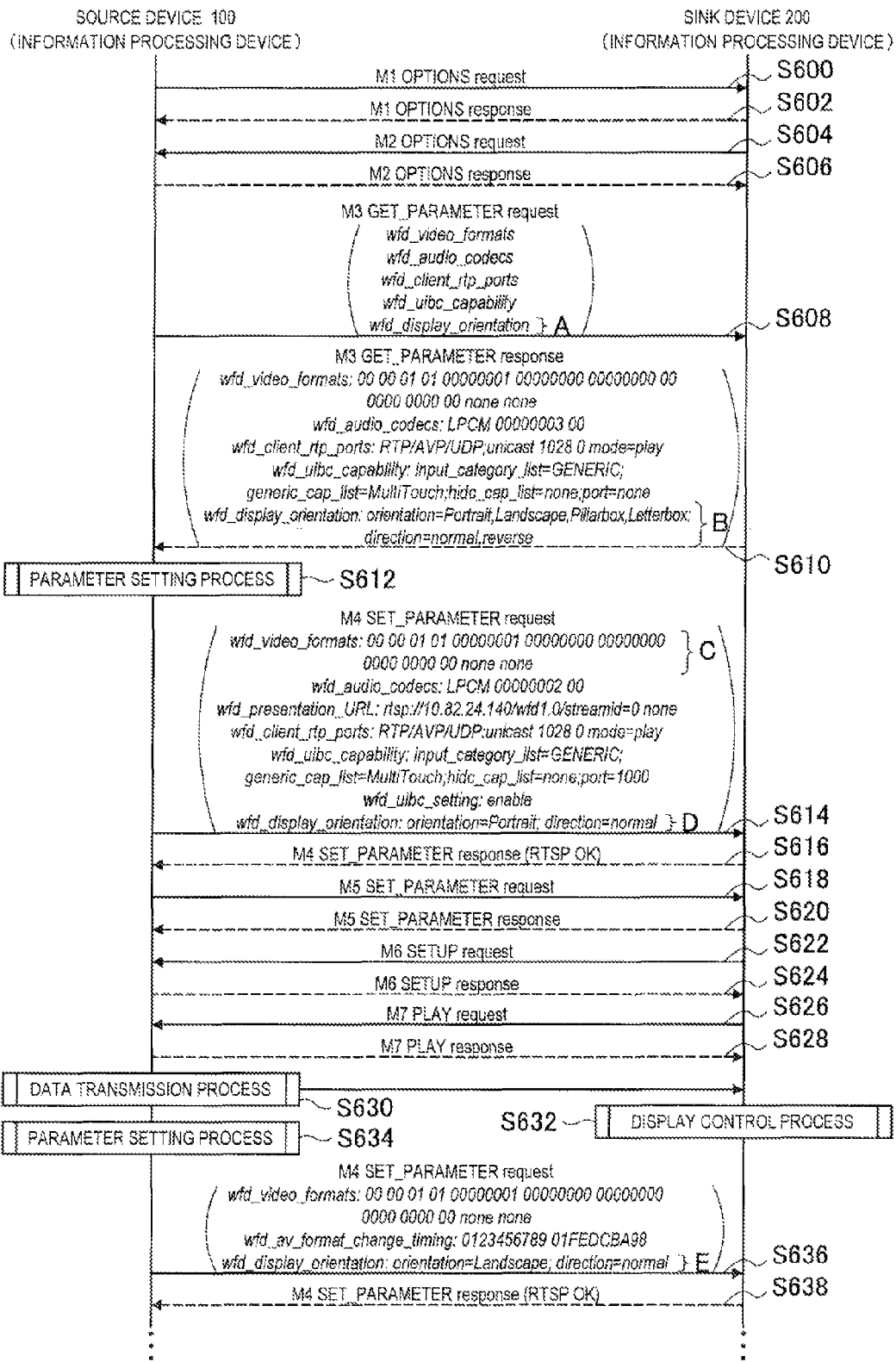
FIG. 14 is a descriptive diagram showing a second example of the process relating to the information processing method according to the embodiment.

FIG. 14 is a descriptive diagram showing the second example of the process relating to the information processing method according to the present embodiment. The processes of Steps S612 and S634 shown in FIG. 14 correspond to, for example, the process of (1) described above (setting process). In addition, the processes of Steps S608, S614, S630, and S636 shown in FIG. 14 correspond to, for example, the process of (2) described above (communication control process). In addition, the process of Step S632 shown in FIG. 14 corresponds to, for example, the process of (i) described above (display control process).

Here, the processes of Steps S600 to S632 shown in FIG. 14 are the same as those of Steps S100 to S132 shown in FIG. 6. For this reason, the processes of Steps S600 to S632 will not be described.

When a "display state according to the present embodiment" or a "state of an application according to the present embodiment" is changed after the processes of Steps S600 to S632 (which correspond to the process according to the first example above) are performed, the source device 100 sets parameters using capability information transmitted from the sink device 200 in Step S610 (a parameter setting process of S634).

Here, the process of Step S634 corresponds to a process of re-setting an angle of view and a display direction based on the changed display state according to the present embodiment or the changed state of the application according to the present embodiment. In addition, the source device 100 performs the process shown in FIG. 7 in Step S634 the same as the process of Step S612 which corresponds to the process of Step S112 of FIG. 6.

When the process of Step S634 is performed, the source device 100 transmits "M4 SET_PARAMETER request" that includes the parameters set in Step S634 to the sink device 200 (S636). Here, the parameters shown in E of FIG. 14 correspond to setting information that includes the re-set angle of view and display direction.

When "M4 SET_PARAMETER request" has been transmitted from the source device 100 to the sink device 200 in Step S636, the same processes as those of Steps S614 to S632 which correspond to the processes of Steps S114 to S132 of FIG. 6 are performed between the source device 100 and the sink device 200 (S638, . . . ).

In the information processing system according to the present embodiment, when the "display state according to the present embodiment" or "state of the application according to the present embodiment" is changed after the angle of view and display direction of the transmitted image data are set, for example, the process shown in, for example, FIG. 14 is performed as the process relating to the information processing method according to the present embodiment.

Here, in the process according to the second example shown in FIG. 14, the source device 100 transmits the setting information that includes the angle of view and the display direction set in Steps S612 and S634 that correspond to the process of (1) described above (setting process) to the sink device 200 in Steps S614 and S636 that correspond to the process of (2) described above (communication control process). In addition, in the process according to the second example shown in FIG. 14, the sink device 200 causes an image represented by image data to be displayed on a display screen based on the received setting information in Step S632 that corresponds to the process of (i) described above (display control process) and a step corresponding to Step S632 after Step S638 which is not shown in the drawing.

Thus, even when the process according to the second example shown in FIG. 14 is performed, the image displayed on the display screens can be interlinked between the devices in the same manner as when the process according to the first example shown in FIG. 6 is performed.

In addition, even when the process according to the second example shown in FIG. 14 is performed, the same effect as that obtained when the process according to the first example shown in FIG. 6 is performed can be exhibited.

[2-2-3] Third Example of the Process Relating to the Information Processing Method According to the Present Embodiment Note that the process relating to the information processing method according to the present embodiment is not limited to the process according to the first example and the process according to the second example described above. For example, as described above, the display direction of an image according to the present embodiment is not limited to expression of a direction mode corresponding to a predetermined angle such as "normal" or "reverse" shown in FIGS. 6 and 14. For example, a display direction of an image according to the present embodiment can also be expressed by an arbitrary angle that defines a rotation angle of the image. Thus, as a third example of the process relating to the information processing method according to the present embodiment, an example of a process performed when a display direction according to the present embodiment is expressed by an angle will be described.

Figure 15:
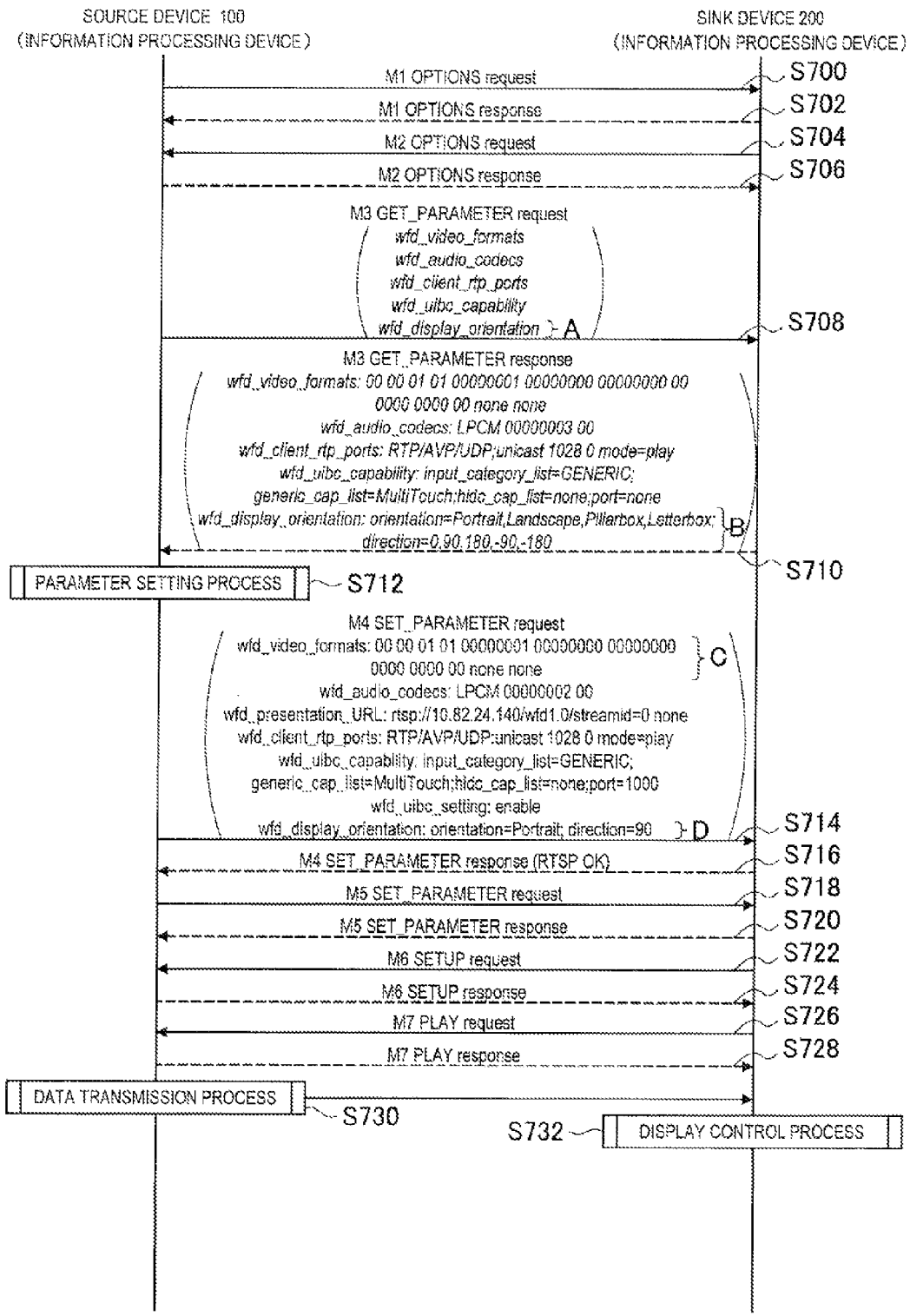
FIG. 15 is a descriptive diagram showing a third example of the process relating to the information processing method according to the embodiment.

FIG. 15 is a descriptive diagram showing an example of a third example of the process relating to the information processing method according to the present embodiment. The process of Step S712 shown in FIG. 15 corresponds to, for example the process of (1) described above (setting process). In addition, the processes of Steps S708, S714, and S730 shown in FIG. 15 correspond to, for example, the process of (2) described above (communication control process). In addition, the process of Step S732 shown in FIG. 15 corresponds to, for example, the process of (i) described above (display control process).

Figure 16:
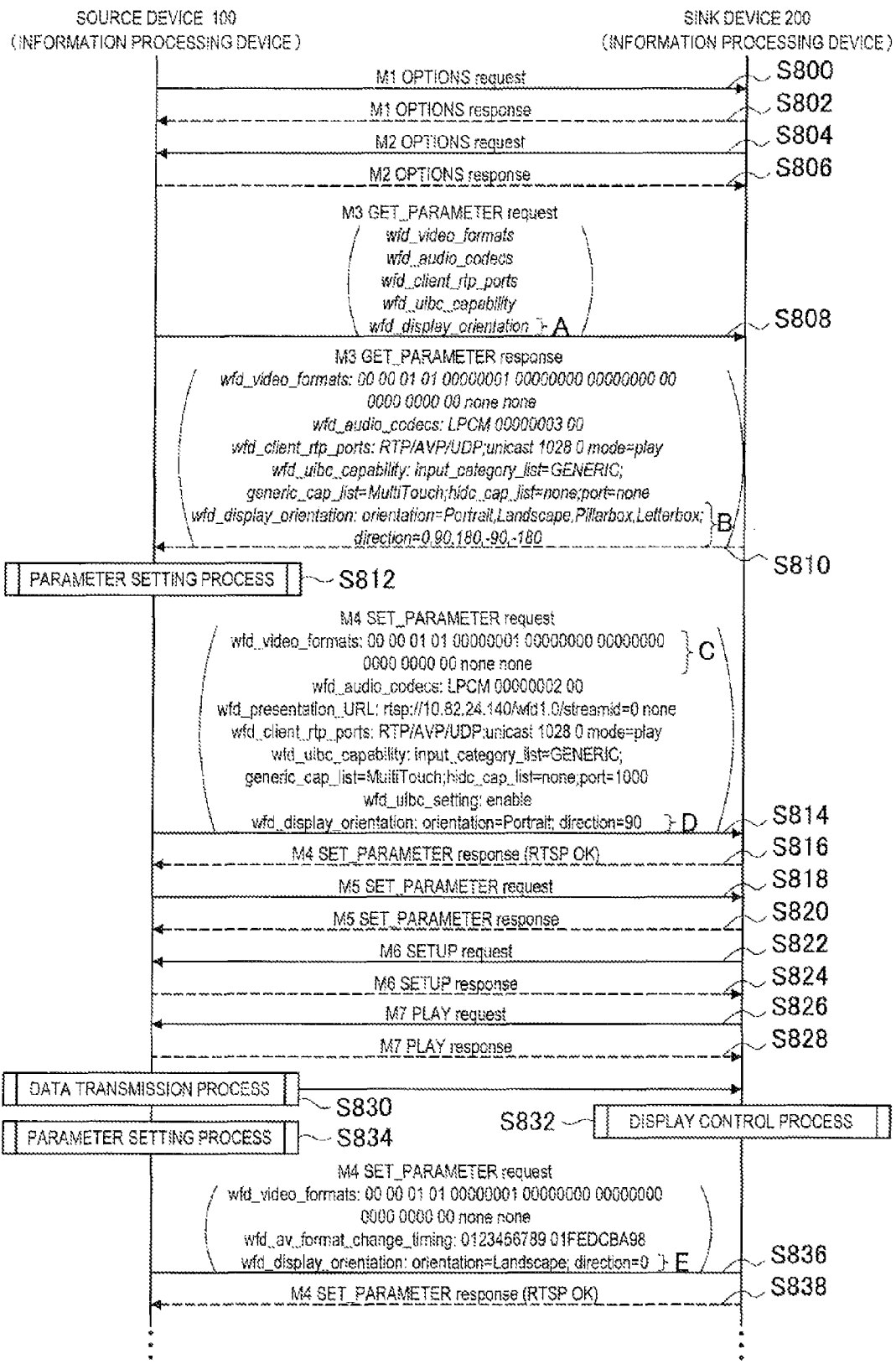
FIG. 16 is a descriptive diagram showing another example of the third example of the process relating to the information processing method according to the embodiment.

In addition, FIG. 16 is a descriptive diagram showing another example of the third example of the process relating to the information processing method according to the present embodiment. The processes of Steps S812 and S834 shown in FIG. 16 correspond to, for example the process of (1) described above (setting process). In addition, the processes of Steps S808, S814, S830, and S836 shown in FIG. 16 correspond to, for example, the process of (2) described above (communication control process). In addition, the process of Step S832 shown in FIG. 16 corresponds to, for example, the process of (i) described above (display control process).

Herein, FIG. 15 shows a process performed when a display direction is expressed by an angle in the process according to the first example shown in FIG. 6, and FIG. 16 shows a process performed when a display direction is expressed by an angle in the process according to the second example shown in FIG. 14. Hereinafter, a difference of FIG. 15 from the process according to the first example shown in FIG. 6 and a difference of FIG. 16 from the process according to the second example shown in FIG. 14 will be described, and the same processes will not be described.

When a display direction according to the present embodiment is expressed by an angle, the display direction represented by capability information is expressed by an angle as shown in, for example, B of FIG. 15 and B of FIG. 16. When the display direction represented by the capability information is expressed by an angle, the source device 100 specifies an angle corresponding to the display direction and sets the specified angle as the display direction, instead of performing the processes of, for example, Steps S218 to S220 shown in FIG. 7 as described above.

In addition, when a display direction according to the present embodiment is expressed by an angle, the display direction represented by the setting information is expressed by an angle as shown in, for example, D of FIG. 15 and D and E of FIG. 16. When the display direction represented by the setting information is expressed by an angle, the sink device 200 causes an image corresponding to each angle of view to be window-displayed within a display screen at the angle corresponding to the display direction, instead of performing the processes of, for example, Steps S402 to S406, S410 to S414, and S418 to S422 shown in FIG. 10 as described above. In addition, when the display direction represented by the setting information is expressed by an angle, the sink device 200 causes the display screen of the display device to rotate at the angle corresponding to the display direction and an image corresponding to each angle of view to be displayed on the display screen, instead of performing the processes of, for example, Steps S502 to S506, S510 to S514, and S518 to S522 shown in FIG. 12 as described above.

In the information processing system according to the present embodiment, for example, the processes shown in FIGS. 15 and 16 are performed as the process relating to the information processing method according to the present embodiment.

Here, the process according to the third example shown in FIG. 15 is a process performed when a display direction is expressed by an angle in the process according to the first example shown in FIG. 6, and the process according to the third example shown in FIG. 16 is a process performed when a display direction is expressed by an angle in the process according to the second example shown in FIG. 14.

Thus, even when the processes according to the third example shown in FIGS. 15 and 16 are performed, an image displayed on the display screen can be interlinked between the devices in the same manner as when the process according to the first example shown in FIG. 6 and the process according to the second example shown in FIG. 14 are performed.

In addition, even when the processes according to the third example shown in FIGS. 15 and 16 are performed, the same effect as that obtained when the process according to the first example shown in FIG. 6 or the process according to the second example shown in FIG. 14 is performed can be exhibited.

In the information processing system according to the present embodiment, as the process relating to the information processing method according to the present embodiment, for example, the process according to the first example to the process according to the third example described above are performed.

Note that, in the information processing system according to the present embodiment, the process relating to the information processing method according to the present embodiment is not limited to the process according to the first example to the process according to the third example described above.

With regard to the process according to the first example to the process according to the third example described above, for example, a process performed when the process relating to the information processing method according to the present embodiment is applied to Wi-Fi MIRACAST has been shown, but as described above, application of the process relating to the information processing method according to the present embodiment is not limited to Wi-Fi MIRACAST, and can be applied to an arbitrary communication scheme of either of wired or wireless communication.
(Information Processing System According to Present Embodiment)

Next, an example of configurations of the source device according to the present embodiment (information processing device) and the sink device according to the present embodiment (transmission target device or information processing device) constituting the information processing system according to present embodiment will be described. Hereinafter, the example of the configuration of the source device 100 and the sink device 200 will be described exemplifying a case in which the information processing system according to the present embodiment has the source device 100 and the sink device 200 described with reference to FIGS. 6 to 16.

[I] Source Device 100

Figure 17:
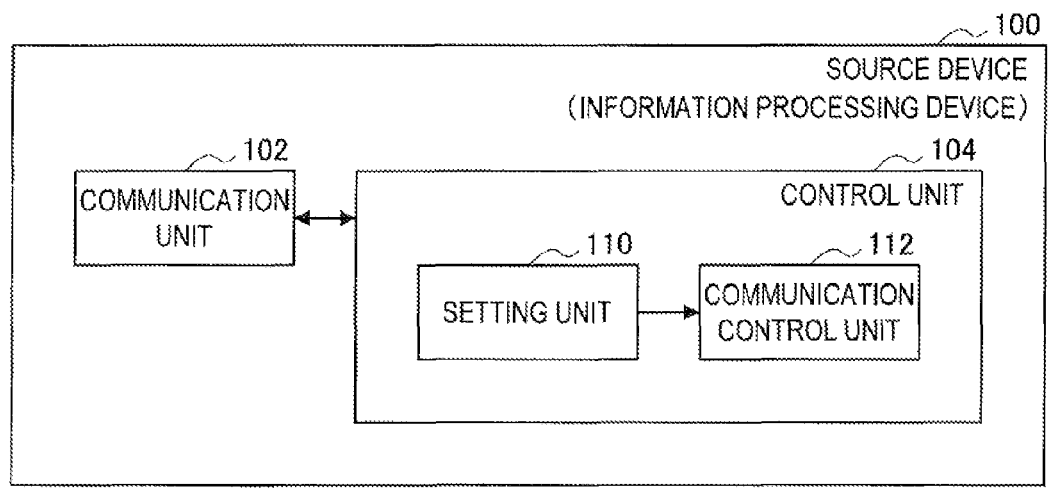
FIG. 17 is a block diagram showing an example of a configuration of the source device according to the embodiment.

FIG. 17 is a block diagram showing an example of a configuration of the source device 100 according to the present embodiment. The source device 100 has, for example, a communication unit 102 and a control unit 104.

In addition, the source device 100 may have, for example, a ROM (Read Only Memory, not shown), a RAM (Random Access Memory, not shown), a storage unit (not shown), an operation unit (not shown) that can be operated by a user, a display unit (not shown) that displays various screens on a display screen, and the like. In the source device 100, the constituent elements are connected to one another by, for example, a bus serving as a data transmission line.

Here, the ROM (not shown) stores data for control such as programs, arithmetic parameters used by the control unit 104, and the like. The RAM (not shown) temporarily stores programs executed by the control unit 104 and the like.

The storage unit (not shown) is a storing section that the source device 100 has, storing various kinds of data, for example, image data, applications, and the like. Here, as the storage unit (not shown), for example, a magnetic recording medium such as a hard disk, a non-volatile memory such as a flash memory, and the like are exemplified. In addition, the storage unit (not shown) may be attached to or detached from the source device 100.

As the operation unit (not shown), an operation input device that will be described later is exemplified, and as the display unit (not shown), a display device that will be described later is exemplified.

[Example of a Hardware Configuration of the Source Device 100]

Figure 18:
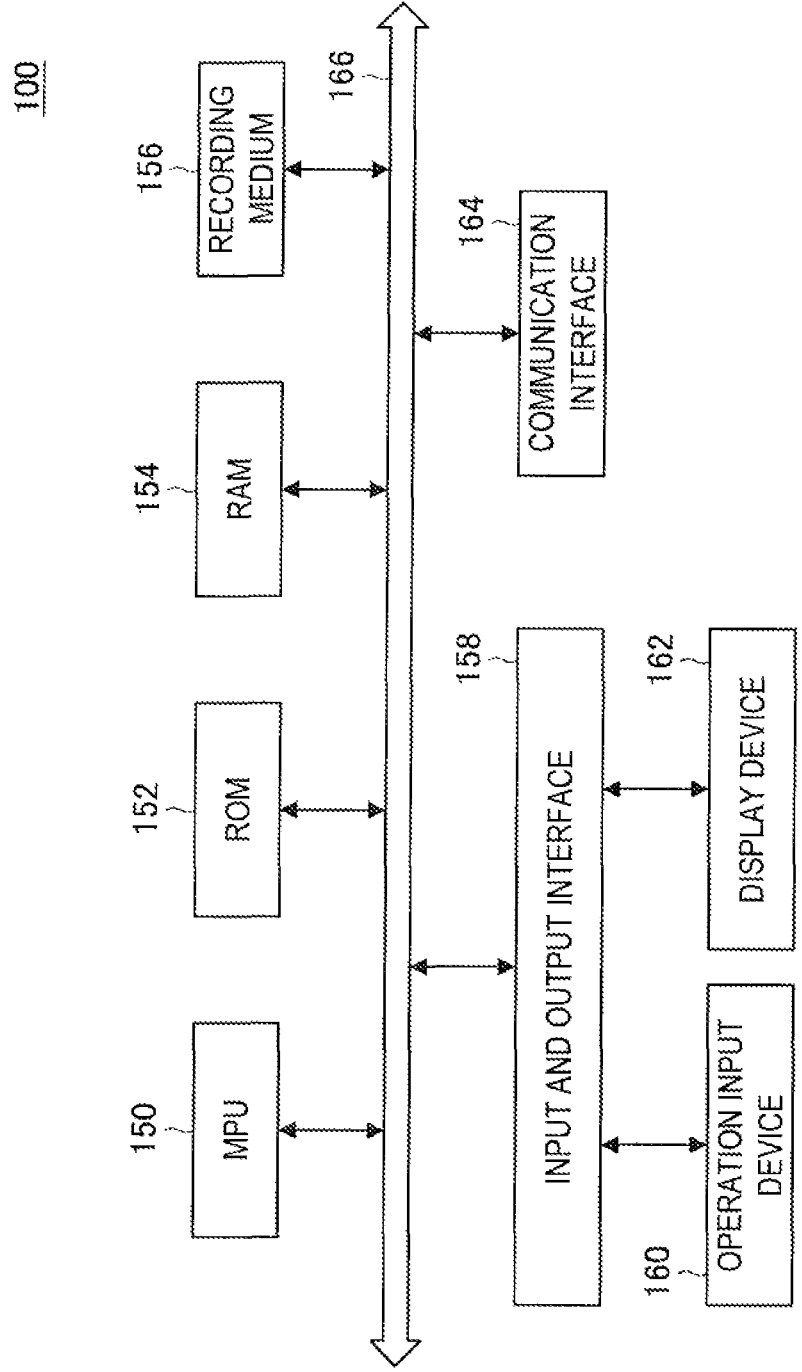
FIG. 18 is an illustrative diagram showing an example of a hardware configuration of the source device according to the embodiment.

FIG. 18 is an illustrative diagram showing an example of a hardware configuration of the source device 100 according to the present embodiment. The source device 100 has, for example, an MPU 150, a ROM 152, a RAM 154, a recording medium 156, an input and output interface 158, an operation input device 160, a display device 162, and a communication interface 164. In addition, in the source device 100, the constituent elements are connected to one another by, for example, a bus 166 serving as a data transmission line.

The MPU 150 is constituted by, for example, an MPU (Micro Processing Unit), various processing circuits, and the like, functioning as the control unit 104 that controls the entire source device 100. In addition, the MPU 150 plays a role of, for example, a setting unit 110 and a communication control unit 112 that will be described later in the source device 100.

The ROM 152 stores data for control of programs, arithmetic parameters, and the like used by the MPU 150. The RAM 154 temporarily stores, for example, programs executed by the MPU 150, and the like.

The recording medium 156 functions as the storage unit (not shown), storing various kinds of data, for example, image data, applications, and the like. Here, as the recording medium 156, for example, a magnetic recording medium such as a hard disk, a non-volatile memory such as a flash memory, or the like is exemplified. In addition, the recording medium 156 may be attached to or detached from the source device 100.

The input and output interface 158 connects, for example, the operation input device 160 and the display device 162. The operation input device 160 functions as the operation unit (not shown), and the display device 162 functions as the display unit (not shown). Here, as the input and output interface 158, for example, a USB (Universal Serial Bus) terminal, a DVI (Digital Visual Interface) terminal, a HDMI (High-Definition Multimedia Interface) terminal, or various kinds of processing circuits are exemplified. In addition, the operation input device 160 is provided, for example, on the source device 100, and connected to the input and output interface 158 inside the source device 100. As the operation input device 160, for example, buttons, direction keys, a rotary type selector such as a jog dial, or a combination thereof and the like are exemplified. In addition, the display device 162 is provided, for example, on the source device 100 and connected to the input and output interface 158 inside the source device 100. As the display device 162, for example, a liquid crystal display, an organic EL device (Organic Electro-Luminescence display, which is also called an OLED (Organic Light Emitting Diode display)), or the like is exemplified.

Note that it is needless to say that the input and output interface 158 can also be connected to an external device such as an operation input device (for example, a keyboard, a mouse, or the like) or a display device as an external device of the source device 100. In addition, the display device 162 may be a device that enables display and a user operation, for example a touch screen, or the like.

The communication interface 164 is a communication section that the source device 100 has, functioning as the communication unit 102 for wired or wireless communication with the sink device 200 or an external apparatus such as a server storing data such as the capability information through a network (or in a direct manner). Here, as the communication interface 164, for example, a communication antenna and an RF (Radio Frequency) circuit (wireless communication), an IEEE 802.15.1 port and a transmission and reception circuit (wireless communication), an IEEE 802.11 port and a transmission and reception circuit (wireless communication), a LAN (Local Area Network) terminal and a transmission and reception circuit (wired communication) or the like are exemplified. In addition, as a network according to the present embodiment, for example, a wired network such as a LAN, or a WAN (Wide Area Network), a wireless network such as a wireless LAN (WLAN; Wireless Local Area Network), a wireless WAN (WWAN; Wireless Wide Area Network) via a base station, or the like, the Internet using communication protocols such as TCP/IP (Transmission Control Protocol/Internet Protocol), or the like is exemplified.

The source device 100 performs the process relating to the information processing method according to the present embodiment (for example, the process of (1) described above (setting process) and the process of (2) described above (communication control process)) in the source device according to the present embodiment based on the configuration shown in, for example, FIG. 18. Note that a hardware configuration of the source device 100 according to the present embodiment is not limited to the configuration shown in FIG. 18.

For example, the source device 100 may have a sensor (or a sensor group, and the same applies hereinbelow) that can detect motions of the source device 100 such as an acceleration sensor or a gyro sensor. When such a sensor that can detect motions is provided, the sensor plays a role of, for example, a detection unit (not shown) that detects orientations of a display screen on which an image is displayed. When such a sensor that can detect motions is provided, the source device 100 detects a change in an orientation of the display screen as shown in A1 and A2 of FIG. 3 and A1 and A2 of FIG. 4 based on, for example, the detected motions and then changes an angle of view and a display direction of the image displayed on the display screen (or causes an external apparatus to change them). Note that the source device 100 can also perform, for example, a process based on a detection result of the connected sensor (external sensor).

In addition, the source device 100 may have, for example, a plurality of communication interfaces which are operated based on different communication schemes or the same communication scheme.

In addition, when communication with the sink device 200 or an external apparatus such as a server is performed via an external communication device connected via the input and output interface 158 or the like, for example, the source device 100 may not have the communication interface 164.

In addition, when the source device 100 performs a process using capability information stored in an external recording medium connected via the input and output interface 158 or the like or a recording medium that an external apparatus such as a server has, the source device 100 may not have the recording medium 156.

In addition, the source device 100 can also have a configuration in which, for example, the operation input device 160 or the display device 162 is not provided.

Referring to FIG. 17 again, an example of the configuration of the source device 100 is described. The communication unit 102 is a communication section that the source device 100 has for performing wireless or wired communication with an external apparatus such as the sink device 200 via a network (or in a direct manner). In addition, communication of the communication unit 102 is controlled by the control unit 104 (to be more specific, by the communication control unit 112).

Here, as the communication unit 102, for example, a communication antenna and an RF circuit, a LAN terminal and a transmission and reception circuit, or the like are exemplified, and a configuration of the communication unit 102 is not limited thereto. For example, the communication unit 102 can have a configuration corresponding to an arbitrary standard by which communication can be performed such as a USB terminal and a transmission and reception circuit or an arbitrary configuration that can communicate with an external apparatus via a network.

The control unit 104 is constituted by, for example, an "MPU," or "various kinds of processing circuits that perform generation and encoding of data such as image data and audio data" playing a role of controlling the entire source device 100. In addition, the control unit 104 has, for example, the setting unit 110 and the communication control unit 112, and plays a leading role of performing the process relating to the information processing method according to the present embodiment in the source device according to the present embodiment.

The setting unit 110 plays a leading role of performing the process of (1) described above (setting process). The setting unit 110 sets an angle of view and a display direction of image data transmitted to the sink device according to the present embodiment in the range of an angle of view and a display direction represented by capability information based on, for example, a "display state according to the present embodiment or a state of an application according to the present embodiment" and "capability information with regard to the sink device according to the present embodiment."

Here, the setting unit 110 sets an angle of view and a display direction based on the capability information transmitted from the sink device according to the present embodiment according to, for example, a transmission request according to the present embodiment.

Note that capability information used by the setting unit 110 in a process is not limited to the above. For example, the setting unit 110 can also use capability information with regard to the sink device according to the present embodiment stored in a storage unit (not shown), a connected external recording medium or an external apparatus such as a server.

When the capability information stored in the storage unit (not shown) or the external recording medium is used, the setting unit 110 searches, for example, the storage unit (not shown). Then, when the capability information with regard to the sink device according to the present embodiment is stored in the storage unit (not shown) or the like, the setting unit 110 reads the capability information from the storage unit (not shown) or the like and then uses the read capability information.

In addition, when the capability information stored in the external apparatus such as a server is used, the setting unit 110 performs, for example, communication with the external apparatus via the communication unit 102, thereby acquiring the capability information with regard to the sink device according to the present embodiment from the external apparatus. Then, when the capability information with regard to the sink device according to the present embodiment is acquired from the external apparatus, the setting unit 110 uses the acquired capability information in a process.

In addition, when the display state according to the present embodiment or state of the application according to the present embodiment is changed, for example, the setting unit 110 re-sets an angle of view and a display direction based on the changed display state according to the present embodiment or the changed state of the application according to the present embodiment.

The communication control unit 112 plays a leading role of performing the process of (2) described above (communication control process). The communication control unit 112 causes, for example, the setting information that includes the set angle of view and display direction transferred from the setting unit 110 to be transmitted to the sink device according to the present embodiment that is a transmission target device.

In addition, when the angle of view and display direction are re-set in the setting unit 110, for example, the communication control unit 112 causes the setting information that includes the re-set angle of view and display direction to be transmitted to the sink device according to the present embodiment.

In addition, the communication control unit 112 may cause a transmission request for transmission to the sink device according to the present embodiment to be transmitted to the sink device according to the present embodiment. When the communication control unit 112 causes the transmission request according to the present embodiment to be transmitted to the sink device according to the present embodiment, the setting unit 110 uses, for example, capability information transmitted from the sink device according to the present embodiment in a process.

In addition, the communication control unit 112 may cause image data according to a setting represented by the setting information transmitted to the sink device according to the present embodiment to be transmitted to the sink device according to the present embodiment as shown in, for example, FIG. 8. Here, the image data according to the setting represented by the setting information according to the present embodiment is generated by, for example a processing circuit (for example, an image generation circuit, an encoder, or the like) constituting the control unit 104.

By having the setting unit 110 and the communication control unit 112, for example, the control unit 104 plays a leading role of the process relating to the information processing method according to the present embodiment in the source device according to the present embodiment.

The source device 100 performs the process relating to the information processing method according to the present embodiment (for example, the process of (1) described above (setting process) and the process of (2) described above (communication control process)) in the source device according to the present embodiment with, for example, the configuration shown in FIG. 17.

Thus, the source device 100 can enable an image displayed on a display screen to be interlinked between the devices with, for example, the configuration shown in FIG. 17.

In addition, the source device 100 can realize the process according to the first example to the process according to the third example (also including a process according to a modified example) with, for example, the configuration shown in FIG. 17. Thus, by having the configuration shown in FIG. 17, for example, the source device 100 can exhibit the same effect as that obtained by performing the process according to the first example to the process according to the third example described above.

Note that a configuration of the source device 100 according to the present embodiment is not limited to the configuration shown in FIG. 17.

For example, the source device 100 according to the present embodiment can have one or both of the setting unit 110 and the communication control unit 112 shown in FIG. 17 separate from the control unit 104 (for example, which is realized as a separate processing circuit).

In addition, when the source device 100 according to the present embodiment performs communication with an external apparatus such as the sink device 200 or the like via an external communication device, for example, the source device 100 may not have the communication unit 102.

[II] Sink Device 200

Figure 19:
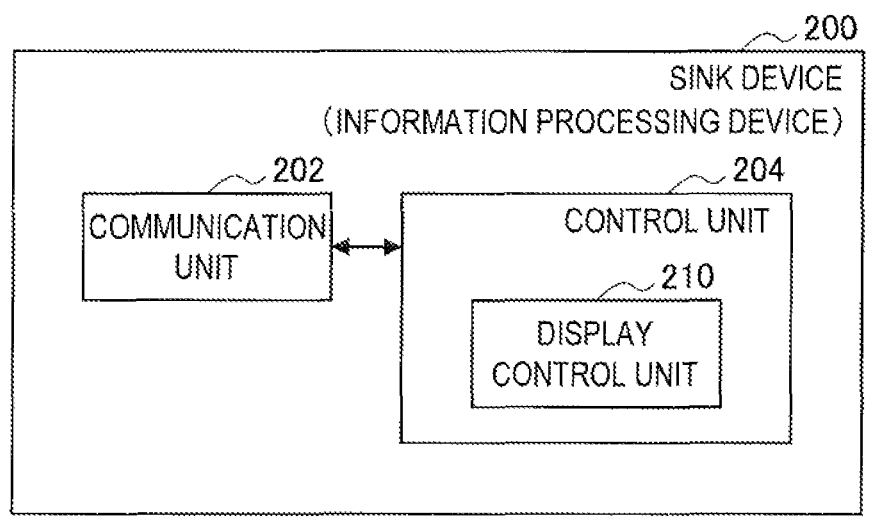
FIG. 19 is a block diagram showing an example of a configuration of the sink device according to the embodiment.

FIG. 19 is a block diagram showing an example of a configuration of the sink device 200 according to the present embodiment. The sink device 200 has, for example, a communication unit 202 and a control unit 204.

In addition, the sink device 200 may have, for example, a ROM (not shown), a RAM (not shown), a storage unit (not shown), an operation unit (not shown) that can be operated by a user, a display unit (not shown) that displays various screens on a display screen, and the like. In the sink device 200, the constituent elements are connected to one another by, for example, a bus serving as a data transmission line.

Here, the ROM (not shown) stores data for control such as programs, arithmetic parameters used by the control unit 204, and the like. The RAM (not shown) temporarily stores programs executed by the control unit 204 and the like.

The storage unit (not shown) is a storing section that the sink device 200 has, storing various kinds of data, for example, capability information, setting information, image data, applications, and the like. Here, as the storage unit (not shown), for example, a magnetic recording medium such as a hard disk, a non-volatile memory such as a flash memory, and the like are exemplified. In addition, the storage unit (not shown) may be attached to or detached from the sink device 200.

As the operation unit (not shown), the operation input device described above is exemplified, and as the display unit (not shown), the display device described above is exemplified.

[Example of a Hardware Configuration of the Sink Device 200]

Figure 20:
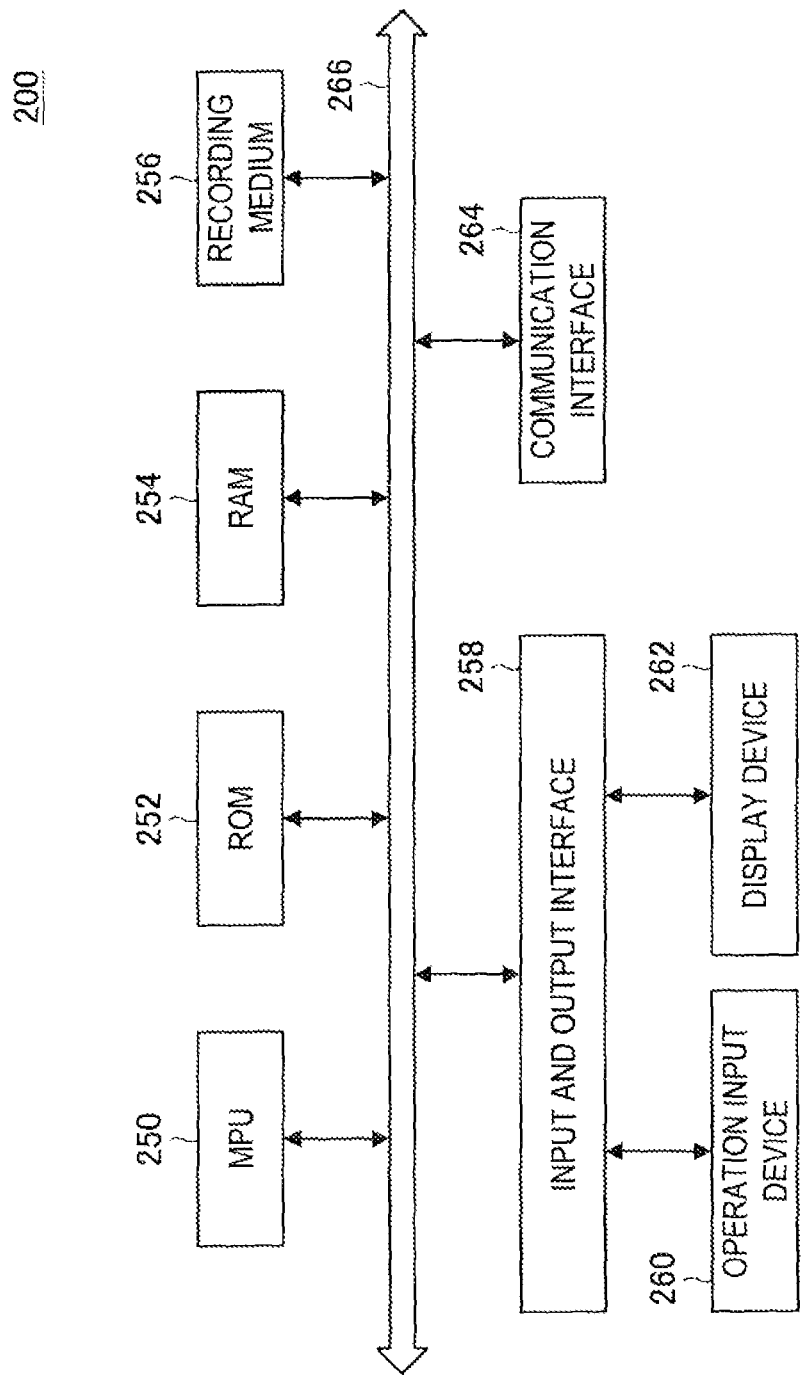
FIG. 20 is an illustrative diagram showing an example of a hardware configuration of the sink device according to the embodiment.

FIG. 20 is an illustrative diagram showing an example of a hardware configuration of the sink device 200 according to the present embodiment. The sink device 200 has, for example, an MPU 250, a ROM 252, a RAM 254, a recording medium 256, an input and output interface 258, an operation input device 260, a display device 262, and a communication interface 264. In addition, in the sink device 200, the constituent elements are connected to one another by, for example, a bus 266 serving as a data transmission line.

As shown in FIG. 20, for example, the sink device 200 can have the same configuration as the example of the hardware configuration (also including a modified example) of the source device 100 shown in, for example, FIG. 18. Note that it is needless to say that an example of a hardware configuration of the sink device 200 is not limited to the same configuration as the example of the hardware configuration of the source device 100 shown in FIG. 18.

The communication unit 202 is a communication section that the sink device 200 has, and performs wireless or wired communication with an external apparatus such as the source device 100 via a network (or in a direct manner). In addition, communication of the communication unit 202 is controlled by, for example, the control unit 204.

Here, as the communication unit 202, for example, a communication antenna and an RF circuit, a LAN terminal and a transmission and reception circuit, or the like are exemplified, and a configuration of the communication unit 202 is not limited thereto. For example, the communication unit 202 can have a configuration corresponding to an arbitrary standard that enables communication such as a USB terminal and a transmission and reception circuit, or an arbitrary configuration that enables communication with an external apparatus via a network.

The control unit 204 is constituted by, for example, an "MPU," or "various kinds of processing circuits that perform decoding of data such as image data and audio data, a process relating to display of images, a process relating to output of sounds," and the like, playing a role of controlling the entire sink device 200. In addition, the control unit 204 has, for example, the display control unit 210, and plays a leading role of performing the process relating to the information processing method according to the present embodiment in the sink device according to the present embodiment.

The display control unit 210 plays a leading role of performing the process of (i) described above (display control process) to cause an image represented by received image data on a display screen based on received setting information. To be more specific, the display control unit 210 causes an image represented by image data to be displayed on a display screen according to an angle of view and a display direction represented by setting information.

Here, the display control unit 210 causes the image represented by image data to be window-displayed within the display screen according to the angle of view and display direction represented by the setting information as shown in, for example, FIG. 10. In addition, the display control unit 210 may cause the display screen of a display device displaying the image represented by the image data to rotate so as to correspond to the display direction represented by the setting information and cause the image represented by the image data to be displayed on the display screen according to the angle of view represented by the setting information as shown in, for example, FIG. 12.

By having the display control unit 210, for example, the control unit 204 plays a leading role of performing the process relating to the information processing method according to the present embodiment in the sink device according to the present embodiment.

The sink device 200 performs the process relating to the information processing method according to the present embodiment (for example, the process of (i) described above (display control process)) in the sink device according to the present embodiment with, for example, the configuration shown in FIG. 19.

Thus, the sink device 200 can cause the image displayed on the display screen to be interlinked between the devices with, for example, the configuration shown in FIG. 19.

In addition, the sink device 200 can realize the process according to the first example to the process according to the third example described above (including a process relating to a modified example) with, for example, the configuration shown in FIG. 19. Thus, the sink device 200 can exhibit the same effect as that obtained by performing the process according to the first example to the process according to the third example described above by having, for example, the configuration shown in FIG. 19.

Note that a configuration of the sink device 200 according to the present embodiment is not limited to the configuration shown in FIG. 19.

For example, the sink device 200 according to the present embodiment can have the display control unit 210 shown in FIG. 19 separate from the control unit 204 (for example, which is realized by a separate processing circuit).

In addition, when the sink device 200 according to the present embodiment performs communication with an external apparatus such as the source device 100 via an external communication device, for example, the sink device 200 may not have the communication unit 202.

Hereinabove, the source device has been described to exemplify a device constituting the information processing system according to the present embodiment, but the present embodiment is not limited thereto. The present embodiment can be applied to various devices, for example, a tablet-type device, a communication device such as a mobile telephone or a smartphone, a video and music reproduction device (or a video and music recording and reproduction device), a game device, a computer such as a PC (Personal Computer), so-called mobile devices, and the like. In addition, the present embodiment can also be applied to, for example, a processing IC (Integrated Circuit) that can be incorporated into such a device described above.

In addition, the sink device has been described to exemplify a device constituting the information processing system according to the present embodiment, but the present embodiment is not limited thereto. The present embodiment can be applied to various devices, for example, a display device such as a television receiver set or a display, a tablet-type device, a communication device such as a mobile telephone or a smartphone, a video and music reproduction device (or a video and music recording and reproduction device), a game device, a computer such as PC (Personal Computer), and the like. In addition, the present embodiment can also be applied to, for example, a processing IC (Integrated Circuit) that can be incorporated into such a device described above.

In addition, in the above, the example in which the information processing system according to the present embodiment has one source device and one sink device has been described, but devices constituting the information processing system according to the present embodiment are not limited thereto.

For example, the information processing system according to the present embodiment may have one or two or more source devices and one or two or more sink devices. In the information processing system according to the present embodiment, for example, it is possible to "interlink an image displayed on a display screen between one source device and one sink device" and "interlink an image displayed on a display screen between one source device and a plurality of sink devices."

In addition, the information processing system according to the present embodiment may have one or two or more transmission devices that transmit, for example, image data, audio data, and the like to the sink device according to the present embodiment. When the information processing system according to the present embodiment has the transmission device, the sink device according to the present embodiment causes the transmission device to transmit image data corresponding to setting information transmitted to the sink device according to the present embodiment.

(Program According to the Present Embodiment)
[i] Program Relating to the Source Device According to the Present Embodiment.

It is possible to interlink an image displayed on a display screen between devices by executing a program that causes a computer to function as a source device according to the present embodiment (for example, a program that enables execution of the process relating to the information processing method according to the present embodiment in the source device according to the present embodiment such as the process of (1) described above (setting process), the process of (2) described above (communication control process), and the like) in the computer.

In addition, by executing the program that causes the computer to function as the source device according to the present embodiment in the computer, for example, it is possible to obtain the same effect as that obtained by performing, for example, the process according to the first example to the process according to the third example (also including the modified example) described above.

[ii] Program Relating to the Sink Device According to the Present Embodiment

It is possible to interlink an image displayed on a display screen between devices by executing a program that causes a computer to function as a sink device according to the present embodiment (for example, a program that enables execution of the process relating to the information processing method according to the present embodiment in the sink device according to the present embodiment such as the process of (i) described above (display control process), and the like) in the computer.

In addition, by executing the program that causes the computer to function as the sink device according to the present embodiment in the computer, for example, it is possible to obtain the same effect as that obtained by performing, for example, the process according to the first example to the process according to the third example (also including the modified example) described above.

Hereinabove, the exemplary embodiment of the present disclosure has been described in detail with reference to the accompanying drawings, and the technical scope of the present disclosure is not limited thereto. It should be understood by those skilled in the art that various modifications, combinations, sub-combinations and alterations may occur depending on design requirements and other factors insofar as they are within the scope of the appended claims or the equivalents thereof.

For example, in the above, provision of the programs (computer programs) for causing computers to respectively function as the source device according to the present embodiment and the sink device according to the present embodiment have been shown, but the present embodiment can also provide recording mediums on which the respective programs are stored or a recording medium on which the programs are stored together.

The configuration described above shows an example of the present embodiment, and of course belongs to the technical scope of the present disclosure.

Additionally, the present technology may also be configured as below.

(1) An information processing device including:
a setting unit configured to set an angle of view and a display direction of image data to be transmitted to a transmission target device within a range of an angle of view and a display direction represented by capability information based on a display state of an image represented by the image data to be transmitted to the transmission target device to which the image data is transmitted on a display screen or a state of an application relating to reproduction of the image data and the capability information with regard to the transmission target device representing the angle of view of the image and the display direction of the image; and
a communication control unit configured to cause setting information representing a setting relating to the image data to be transmitted including the set angle of view and the set display direction to be transmitted to the transmission target device.

(2) The information processing device according to (1), wherein, when the display state or the state of the application is changed, the setting unit re-sets the angle of view and the display direction based on the changed display state or the changed state of the application, and
wherein the communication control unit causes the setting information including the re-set angle of view and the re-set display direction to be transmitted to the transmission target device.

(3) The information processing device according to (1) or (2),
wherein the communication control unit causes a transmission request for causing to the transmission target device to transmit the capability information to be transmitted to the transmission target device, and
wherein the setting unit sets the angle of view and the display direction based on the capability information transmitted from the transmission target device in response to the transmission request.

(4) The information processing device according to any one of (1) to (3), wherein the communication control unit causes image data according to the setting represented by the setting information to be transmitted to the transmission target device.

(5) The information processing device according to any one of (1) to (4), wherein the display direction is expressed by a direction mode corresponding to a predetermined angle.

(6) The information processing device according to any one of (1) to (4), wherein the display direction is expressed by an angle.

(7) An information processing device including:
a display control unit configured to cause an image represented by received image data to be displayed on a display screen based on received setting information representing a setting with regard to the image data to be transmitted,
wherein the setting information includes an angle of view and a display direction in a range of an angle of view of an image and a display direction of the image which correspond to the device itself, and
wherein the display control unit causes the image represented by the image data to be displayed on the display screen according to the angle of view and the display direction represented by the setting information.

(8) The information processing device according to (7), wherein the display control unit causes the image represented by the image data to be window-displayed within the display screen according to the angle of view and the display direction represented by the setting information.

(9) The information processing device according to (7), wherein the display control unit causes a display screen of a display device on which an image represented by the image data is displayed to rotate so as to correspond to the display direction represented by the setting information, and causes an image represented by the image data to be displayed on the display screen according to the angle of view represented by the setting information.

(10) An information processing system including:
an information processing device; and
a transmission target device to which image data is transmitted,
wherein the information processing device includes
a setting unit configured to set an angle of view and a display direction of image data to be transmitted to a transmission target device within a range of an angle of view and a display direction represented by capability information based on a display state of an image represented by the image data to be transmitted to the transmission target device on a display screen or a state of an application relating to reproduction of the image data and the capability information with regard to the transmission target device representing the angle of view of the image and the display direction of the image, and a communication control unit configured to cause setting information representing a setting relating to the image data to be transmitted including the set angle of view and the set display direction to be transmitted to the transmission target device, and wherein the transmission target device includes a display control unit configured to cause an image represented by received image data to be displayed on a display screen based on received setting information, and the display control unit causes the image represented by the image data to be displayed on the display screen according to the angle of view and the display direction represented by the setting information.

What is claimed is:

1. An information processing device comprising:
an interface device configured to enable wireless communication with a transmission target device in accordance with a predetermined protocol; and
a processing circuit configured so as to operate during operation as
(i) a setting unit configured to set setting information which includes an angle of view and a display direction of image data to be transmitted to the transmission target device within a range of an angle of view and a display direction represented by capability information based on a display state of an image represented by the image data to be transmitted to the transmission target device to which the image data is transmitted on a display screen or a state of an application relating to reproduction of the image data and the capability information with regard to the transmission target device representing the angle of view of the image and the display direction of the image, the setting information represents a setting relating to the image data to be transmitted; and
(ii) a communication control unit configured to control the communication with the transmission target to enable interlinking of the image in accordance with a predetermined interlinking standardized scheme,
in which the set angle of view and the set display direction are arranged in a new field which is undefined in the predetermined interlinking standardized scheme,
in which the communication control unit is configured to cause the set angle of view and the set display direction arranged in the new field to be wirelessly transmitted by use of the interface device for reception by the transmission target device, and
in which the communication with the transmission target, including the transmission of the set angle of view and the set display direction arranged in the new field, is in accordance with the predetermined protocol and is compatible with the predetermined interlinking standardized scheme.

2. The information processing device according to claim 1,
wherein, when the display state or the state of the application is changed, the setting unit re-sets the angle of view and the display direction based on the changed display state or the changed state of the application, and
wherein the communication control unit causes the setting information including the re-set angle of view and the re-set display direction to be wirelessly transmitted for reception by the transmission target device.

3. The information processing device according to claim 1,
wherein the communication control unit causes a transmission request to be wirelessly transmitted to the transmission target device, said transmission request requests the transmission target device to transmit the capability information for reception by the information processing device, and
wherein the setting unit sets the angle of view and the display direction based on the capability information transmitted from the transmission target device in response to the transmission request.

4. The information processing device according to claim 1, wherein the communication control unit causes image data according to the setting represented by the setting information to be wirelessly transmitted to the transmission target device.

5. The information processing device according to claim 1, wherein the display direction is expressed by a direction mode corresponding to a predetermined angle.

6. The information processing device according to claim 1, wherein the display direction is expressed by an angle.

7. An information processing device comprising:
an interface device configured to enable wireless communication with another processing device in accordance with a predetermined protocol; and
a processing circuit configured so as to operate during operation as
a display control unit configured to cause an image represented by received image data from the another processing device to be displayed on a display screen based on received setting information representing a setting with regard to the image data to be transmitted,
wherein the received setting information is received by the interface device and is in accordance with the predetermined protocol and compatible with a predetermined interlinking standardized scheme for interlinking a display image,
wherein the setting information includes an angle of view and a display direction in a range of an angle of view of an image and a display direction of the image which correspond to the display screen,
wherein the set angle of view and the set display direction are arranged in a new field which is undefined in the predetermined interlinking standardized scheme and is compatible with the predetermined interlinking standardized scheme, and
wherein the display control unit causes the image represented by the image data to be displayed on the display screen according to the angle of view and the display direction represented by the setting information.

8. The information processing device according to claim 7, wherein the display control unit causes the image represented by the image data to be window-displayed within the display screen according to the angle of view and the display direction represented by the setting information.

9. The information processing device according to claim 7, wherein the display control unit causes a display screen of a display device on which an image represented by the image data is displayed to rotate so as to correspond to the display direction represented by the setting information, and causes an image represented by the image data to be displayed on the display screen according to the angle of view represented by the setting information.

10. An information processing system comprising:
   an information processing device; and
   a transmission target device to which image data is transmitted,
   wherein the information processing device includes
   an interface device configured to enable wireless communication between the information processing device and the transmission target device in accordance with a predetermined protocol; and
   a processing circuit configured so as to operate during operation as
      (i) a setting unit configured to set setting information which includes an angle of view and a display direction of image data to be transmitted to a transmission target device within a range of an angle of view and a display direction represented by capability information based on a display state of an image represented by the image data to be transmitted to the transmission target device on a display screen or a state of an application relating to reproduction of the image data and the capability information with regard to the transmission target device representing the angle of view of the image and the display direction of the image, the setting information represents a setting relating to the image data to be transmitted, and
      (ii) a communication control unit configured to control the communication with the transmission target to enable interlinking of the image in accordance with a predetermined interlinking standardized scheme,
   in which the set angle of view and the set display direction are arranged in a new field which is undefined in the predetermined interlinking standardized scheme,
   in which the communication control unit is configured to cause the set angle of view and the set display direction arranged in the new field to be wirelessly transmitted by use of the interface device for reception by the transmission target device, and
   in which the communication with the transmission target, including the transmission of the set angle of view and the set display direction arranged in the new field, is in accordance with the predetermined protocol and is compatible with the predetermined standardized scheme and
   wherein the transmission target device includes a display control unit configured to cause an image represented by received image data to be displayed on a display screen based on received setting information, and the display control unit causes the image represented by the image data to be displayed on the display screen according to the angle of view and the display direction represented by the setting information.

11. The information processing device according to claim 1, wherein the predetermined protocol is RTSP (Real Time Streaming Protocol) and the predetermined interlinking standardize scheme is Wi-Fi MIRACAST, such that the new field wherein the set angle of view and the set display direction are arranged is undefined in Wi-Fi MIRACAST.

12. The information processing device according to claim 11, wherein the set angle of view in the new field is a vertically long angle of view.

* * * * *